US009660467B2

(12) United States Patent
Chao et al.

(10) Patent No.: US 9,660,467 B2
(45) Date of Patent: May 23, 2017

(54) PORTABLE POWERBANK WITH INTEGRATED PROMOTIONAL-VIDEO CAPABILITIES AND METHODS OF USE

(71) Applicant: TwinTech Industry, Inc., Cerritos, CA (US)

(72) Inventors: Hsin-Chia Chao, Rossmoor, CA (US); Li-Te David Tai, Elk Grove Village, IL (US)

(73) Assignee: TwinTech Industry, Inc., Cerritos, CA (US)

( * ) Notice: Subject to any disclaimer, the term of this patent is extended or adjusted under 35 U.S.C. 154(b) by 0 days.

(21) Appl. No.: 15/094,995

(22) Filed: Apr. 8, 2016

(65) Prior Publication Data

US 2016/0301229 A1    Oct. 13, 2016

Related U.S. Application Data

(60) Provisional application No. 62/145,249, filed on Apr. 9, 2015.

(51) Int. Cl.
| | | |
|---|---|---|
| *H02J 7/00* | (2006.01) | |
| *G06Q 30/02* | (2012.01) | |
| *H04N 21/41* | (2011.01) | |
| *H04N 21/414* | (2011.01) | |
| *H04N 21/422* | (2011.01) | |
| *H04N 21/439* | (2011.01) | |

(Continued)

(52) U.S. Cl.
CPC ........ *H02J 7/0044* (2013.01); *G06Q 30/0261* (2013.01); *H02J 7/0027* (2013.01);
(Continued)

(58) Field of Classification Search
CPC ... H02J 7/0044; H04W 68/00; G06Q 30/0207
(Continued)

(56) References Cited

U.S. PATENT DOCUMENTS 5,793,188 A * 8/1998 Cimbal ................. H01M 10/44
320/130
7,769,415 B2 * 8/2010 Vuong .............. H04M 1/72566
320/132

(Continued)

*Primary Examiner* — Richard Isla Rodas
*Assistant Examiner* — Johali Torres Ruiz
(74) *Attorney, Agent, or Firm* — Terrence M. Wyles, Esq.; Startup IP Law, LLC

(57) ABSTRACT

The inventive disclosures contained herein are generally directed to an improved portable powerbank (or battery bank) that is integrated with video storage and playback/display capabilities for use as a promotional product and/or related services. Effectively, the improved device is an electronic billboard and/or video player that can keep a user engaged because of a user's motivation to use the powerbank functionality. The combination of the improved powerbank's high user utility with the integrated video/audio player's strong capability in communicating promotional messages, the VIP significantly elevates the promotional effectiveness of each VIP device, as compared with the individual parts of the sum. The VIP incorporates control logic that implements strategic algorithms that are designed to enable or disable certain functional capabilities of the VIP in order to encourage end-users to actually watch/listen to promotional video and/or audio media for a predetermined minimum number of VIP operational cycles.

28 Claims, 28 Drawing Sheets

(51) Int. Cl.
*H04N 21/443* (2011.01)
*H04N 21/81* (2011.01)
*H04W 84/12* (2009.01)

(52) U.S. Cl.
CPC .......... *H02J 7/0045* (2013.01); *H02J 7/0052* (2013.01); *H04N 21/4126* (2013.01); *H04N 21/41407* (2013.01); *H04N 21/42202* (2013.01); *H04N 21/4396* (2013.01); *H04N 21/4432* (2013.01); *H04N 21/812* (2013.01); *H02J 2007/0062* (2013.01); *H04W 84/12* (2013.01)

(58) Field of Classification Search
USPC .......................... 320/144, 114; 340/7.1, 7.2
See application file for complete search history.

(56) References Cited

U.S. PATENT DOCUMENTS

| | | | | |
|---|---|---|---|---|
| 8,280,541 B1* | 10/2012 | Chen | ................. | G06F 3/165 700/94 |
| 2011/0225032 A1* | 9/2011 | Kobres | ............ | G06Q 30/0226 705/14.27 |
| 2012/0095840 A1* | 4/2012 | Levi | .................. | G06Q 30/0241 705/14.66 |
| 2012/0209670 A1* | 8/2012 | Zealer | ................... | G06Q 30/02 705/14.1 |
| 2015/0303727 A1* | 10/2015 | Jeong | ................... | H02J 7/0044 320/103 |
| 2016/0164326 A1* | 6/2016 | Chen | ................... | H02J 7/0047 320/107 |

* cited by examiner

PORTABLE POWERBANK WITH INTEGRATED PROMOTIONAL-VIDEO CAPABILITIES AND METHODS OF USE

CROSS-REFERENCE TO RELATED APPLICATIONS

This patent application Claims the priority benefit of U.S. Patent Application No. 62/145,249, filed on Apr. 9, 2015 for "Improved Portable Powerbank With Integrated Promotional-Video Capabilities and Methods of Use". In addition, this patent application hereby incorporates U.S. Patent Application No. 62/145,249 by reference in its entirety for all purposes, and is to be interpreted consistent with this patent application. Moreover, any embodiments, variations, and other disclosures contained within U.S. Patent Application No. 62/145,249 that are not reflected in this patent are intended to be viewed as alternative/additional embodiments, variations, etc. However, if there are any irreconcilable conflicts between the disclosures of this patent application and the disclosures of U.S. Patent Application No. 62/145,249, then this patent application's disclosures on such issues shall be controlling for interpreting patent Claims.

BACKGROUND

The nearly constant use of myriad mobile electronic devices by consumers has long been ubiquitous in society, causing requiring many, if not most, consumers to seek means to be able to recharge and/or increase their mobile charge capacity for their mobile devices while away from their usual outlet-supplied chargers at home or office. The market for portable powerbanks has grown rapidly, as the cost and size has gone down. This in turn has led to a promotional-product opportunity.

However, by itself, a portable powerbank provides very limited effectiveness as a brand-promotion tool in terms of longevity and frequency of instilling brand impressions. If, for example, target consumers are given a small powerbank device that has a brand statically incorporated on the packaging and/or the device itself, many, if not most, of those consumers quickly forget about the source of the powerbank device (despite the static branding on the device) and merely concentrate on the charging utility of the device for their mobile devices.

What is needed is an improved portable powerbank device with enhanced capabilities to instill long-lasting and/or repeated brand impressions on a user.

BRIEF SUMMARY

The inventive disclosures contained herein are generally directed to an improved portable powerbank (or battery bank) that is integrated with video storage and playback/display capabilities for use as a promotional product and/or related services. This integration of the additional media-play capability and related additional functionality represents a major step apart from existing powerbanks, including the many versions of powerbanks used in the promotions industry. Effectively, the improved device is an electronic billboard and/or video player that can keep a user engaged because of a user's motivation to use the powerbank functionality. The improved device is sometimes herein referred to as a "Video-In-Powerbank" ("VIP") or as a "Billboard-In-Powerbank" ("BIP"), or both ("VIP/BIP"), and each use of any of these terms should be construed as including the others, though for simplicity, "VIP" is generally a preferred term.

The combination of the improved powerbank's high user utility with the integrated video/audio player's strong capability in communicating promotional messages, the VIP significantly elevates the promotional effectiveness of each VIP device, as compared with the individual parts of the sum.

In most embodiments, the VIP incorporates control logic that implements one or more strategic algorithms that are designed to enable or disable certain functional capabilities of the VIP in order to encourage end-users to actually watch/listen to promotional video and/or audio media for a predetermined minimum number of VIP operational cycles, which are tracked internally, before releasing certain functional capabilities for end-user use in order to help promotions companies and/or their clients ensure that a VIP given out to end-users is providing a requisite amount of commercial exposure to whatever promotional messages are intended to be communicated to end-users.

Some embodiments have other enhancements, including an incorporated count-down-timer function that is superimposed on the displayed video images, which in turn can be used for event count-down or other functions that require the use of time-tracking.

The foregoing Brief Summary is intended to merely provide a short, general overview of the inventive disclosure described throughout this patent application, and therefore, is not intended to limit the scope of the inventive disclosure contained throughout the balance of this patent application, including the appended Claims and Drawings.

BRIEF DESCRIPTION OF THE DRAWINGS

FIGS. 4C-1 through 4C-5 depicts one embodiment of detailed circuit diagrams employed for a printed circuit board for an improved portable powerbank device with an integrated audio-video content player and display.

DETAILED DESCRIPTION

I. Overview

Figure 1A:
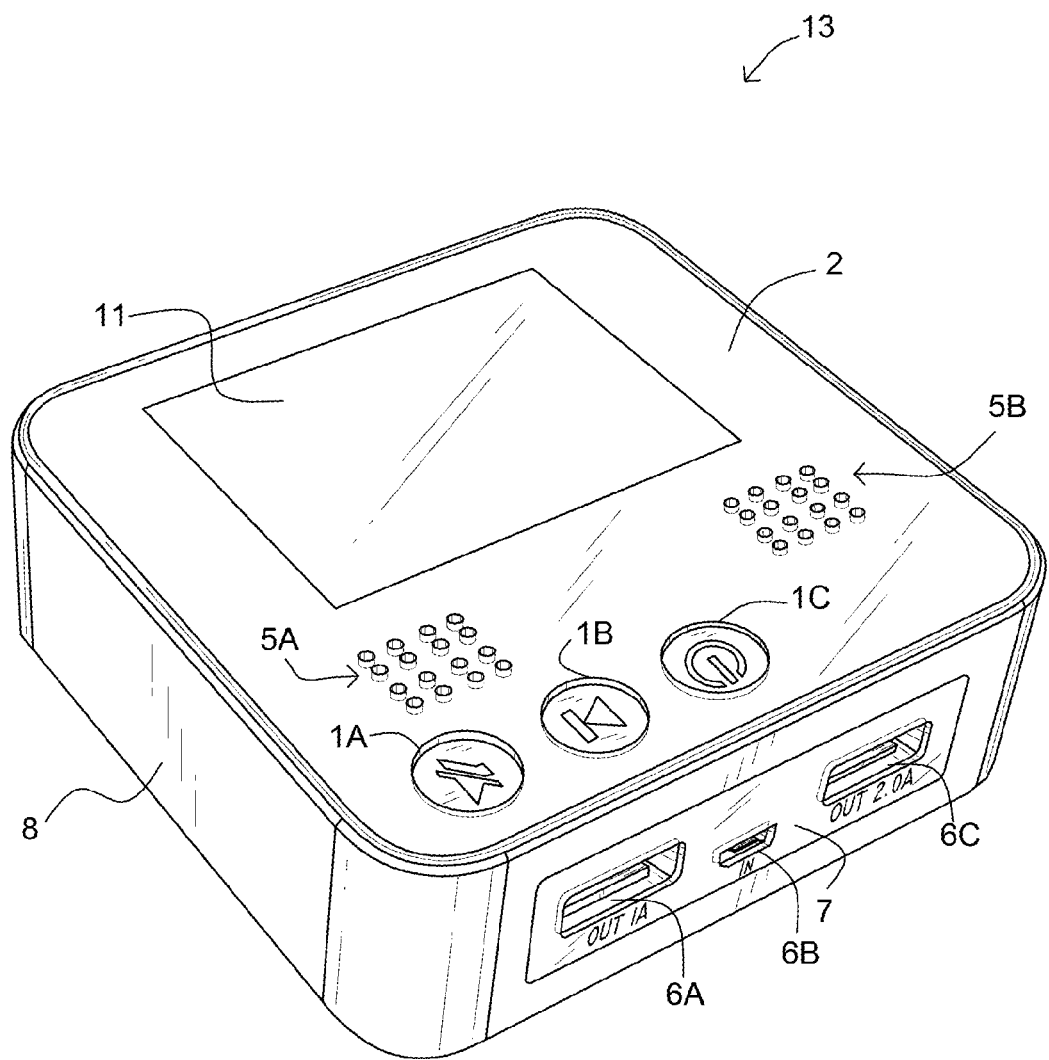
FIG. 1A depicts one embodiment of an isometric view of an improved portable powerbank device with an integrated audio-video content player and display.
Figure 1B:
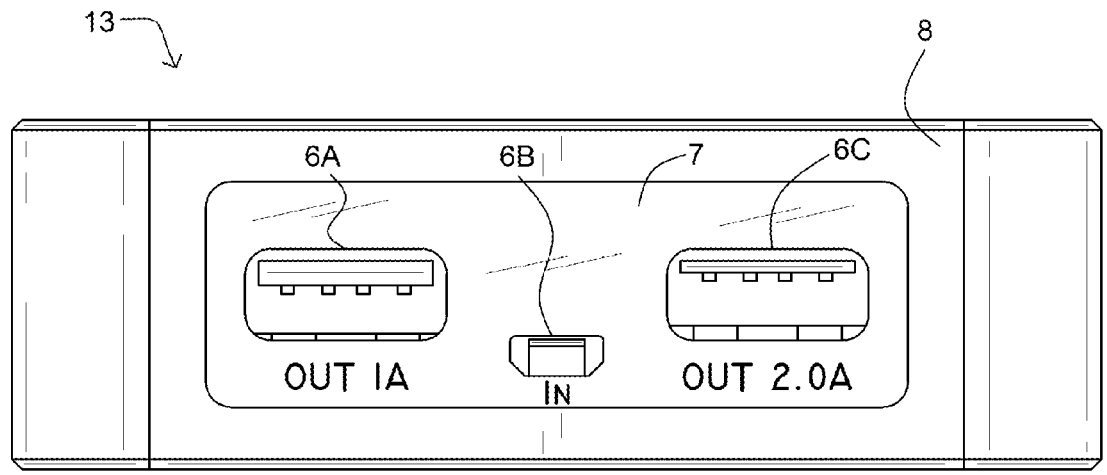
FIG. 1B depicts one embodiment of the front view of an improved portable powerbank device with an integrated audio-video content player and display.
Figure 1C:
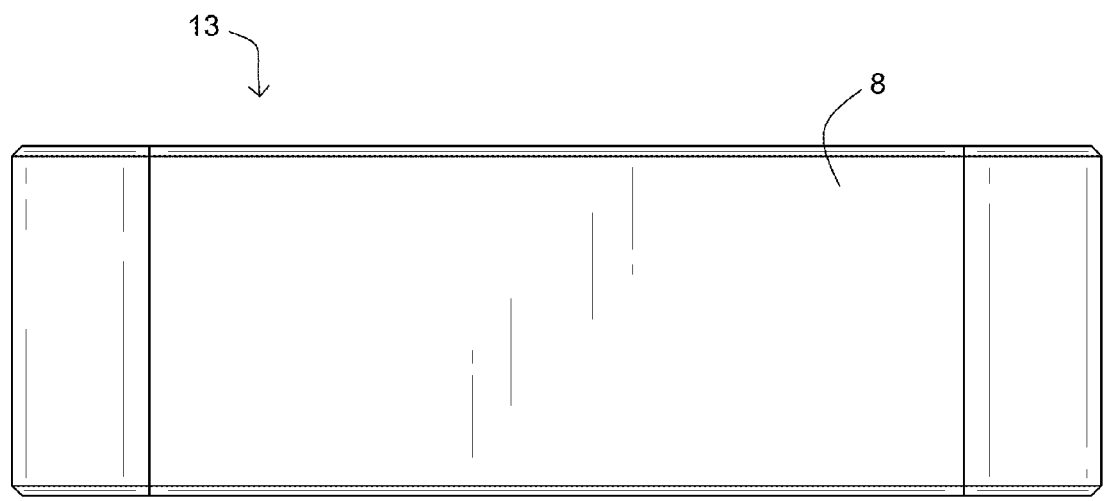
FIG. 1C depicts one embodiment of the rear view of an improved portable powerbank device with an integrated audio-video content player and display.
Figure 1D:
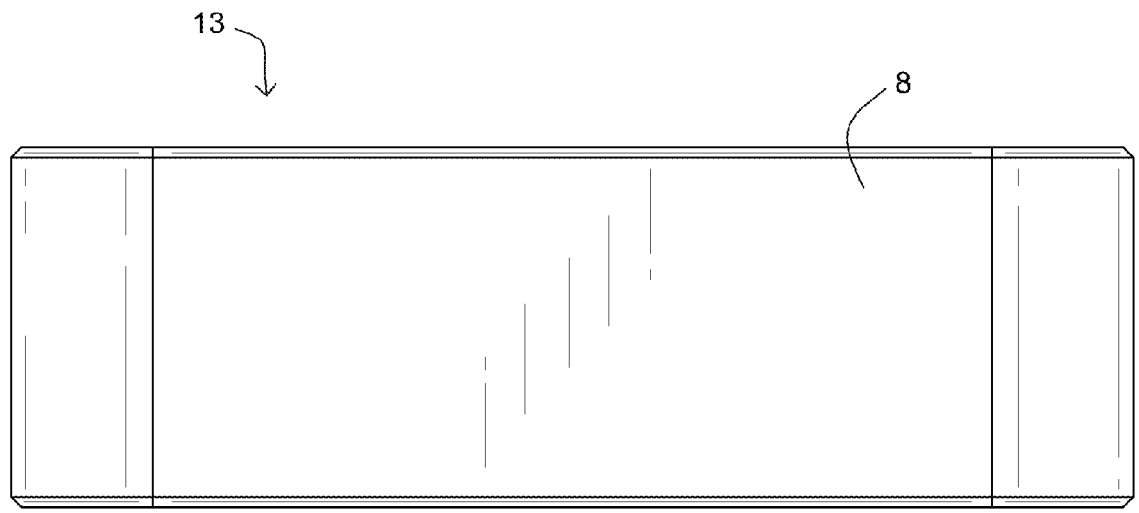
FIG. 1D depicts one embodiment of the left-side view of an improved portable powerbank device with an integrated audio-video content player and display.
Figure 1E:
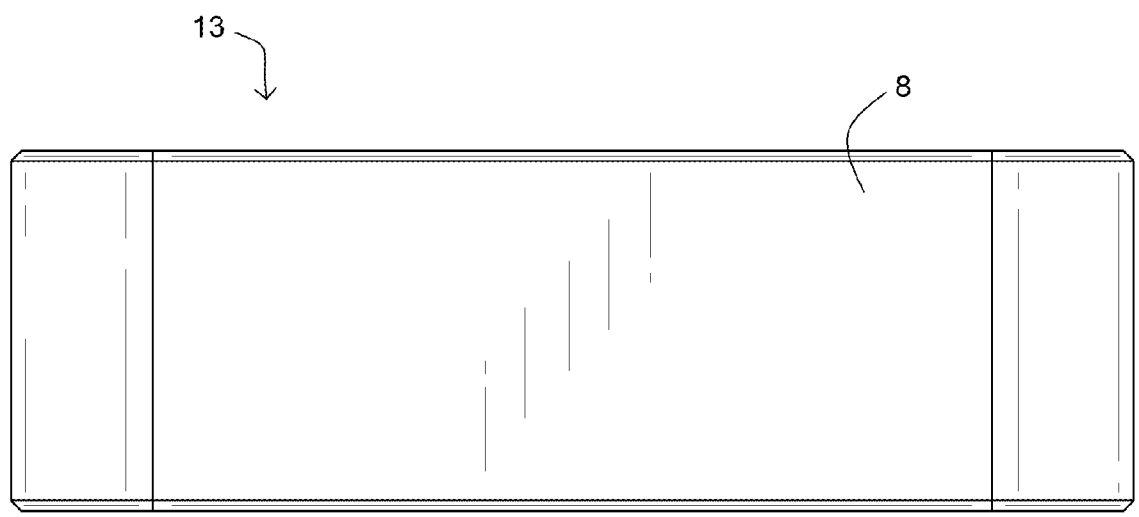
FIG. 1E depicts one embodiment of the right-side view of an improved portable powerbank device with an integrated audio-video content player and display.
Figure 1F:
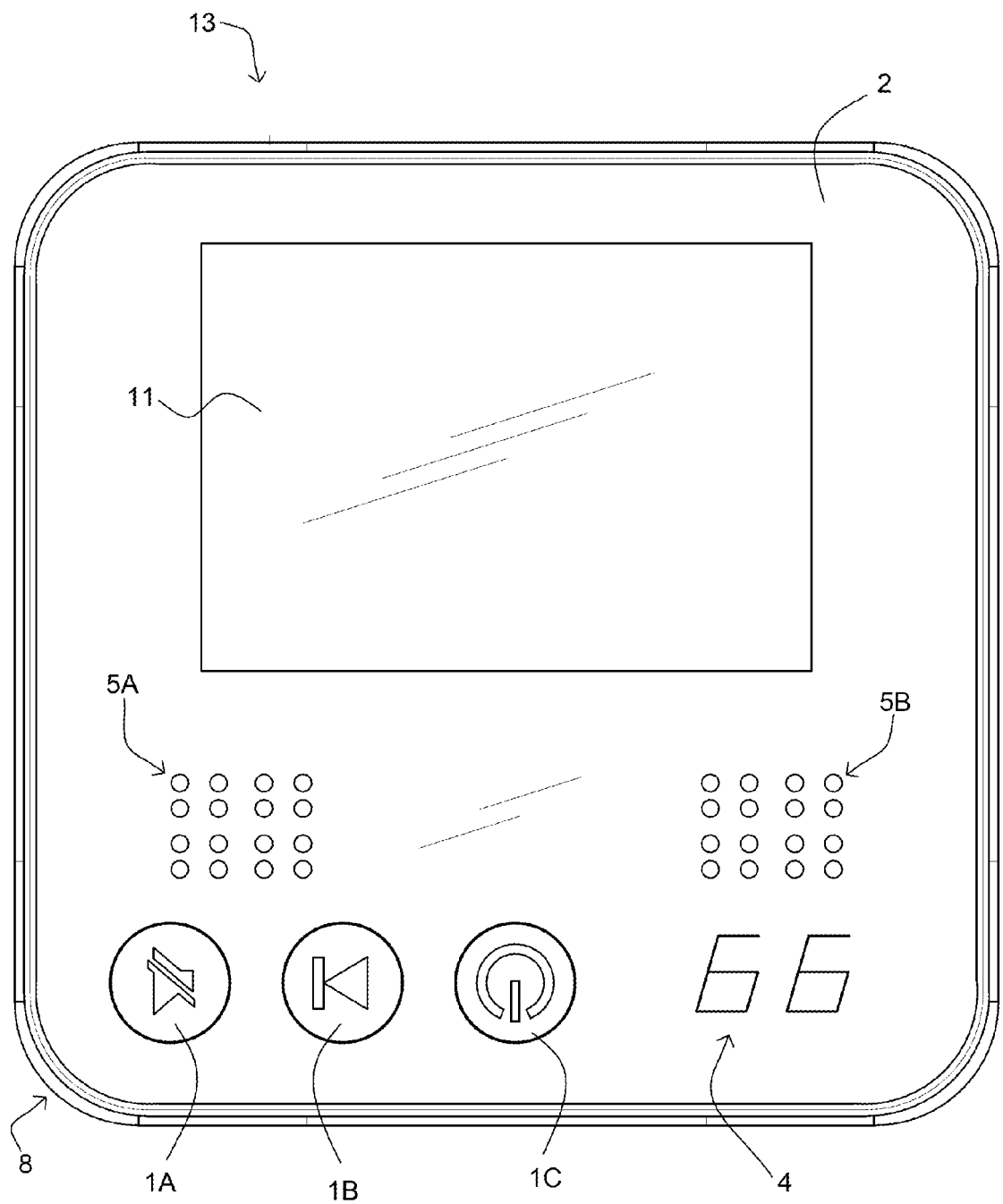
FIG. 1F depicts one embodiment of the top view of an improved portable powerbank device with an integrated audio-video content player and display.
Figure 1G:
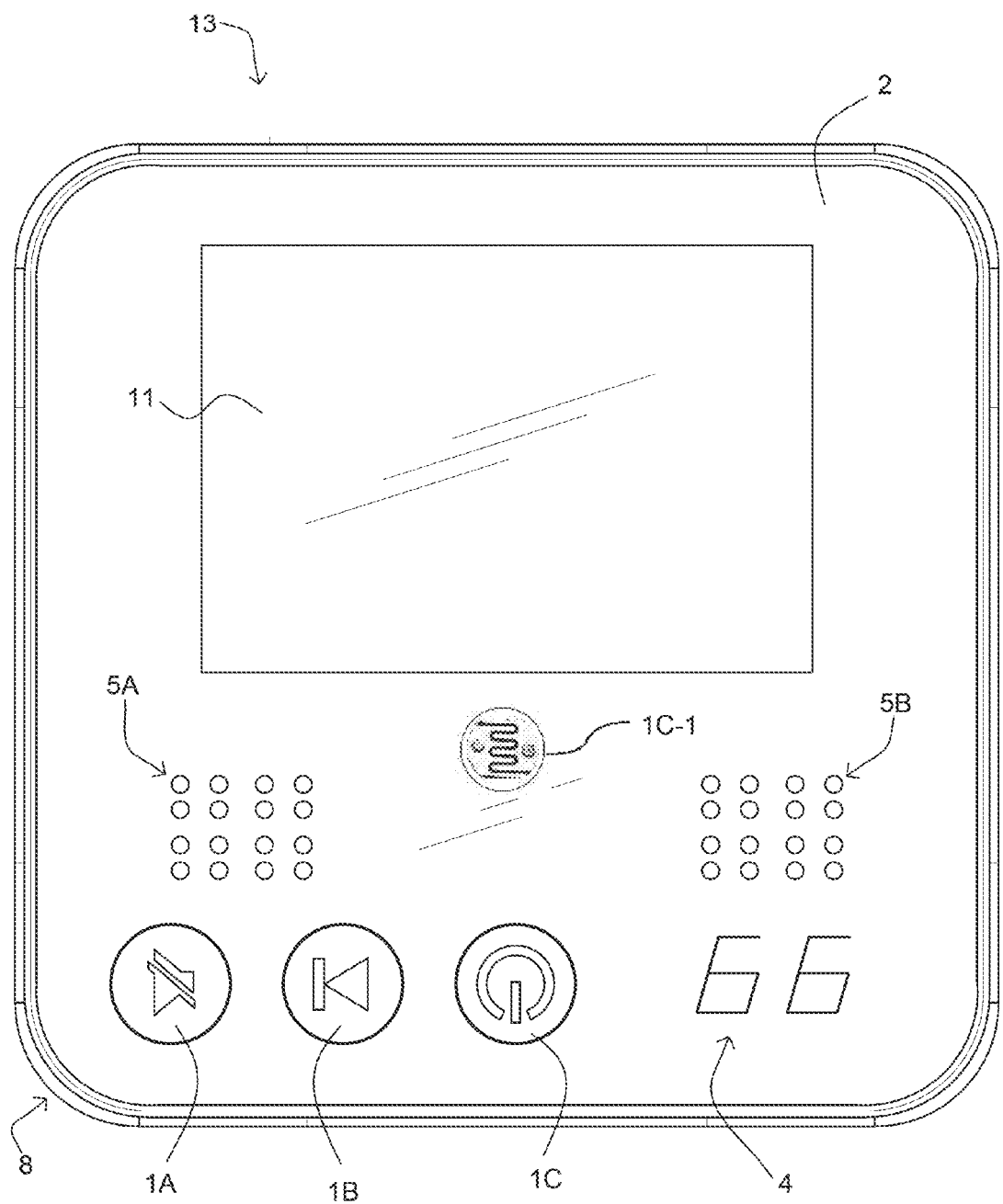
FIG. 1G depicts a variation of the embodiment shown in FIG. 1F; that is, one embodiment of the top view of an improved portable powerbank device with an integrated audio-video content player and display that also includes a light-detection sensor.
Figure 1H:
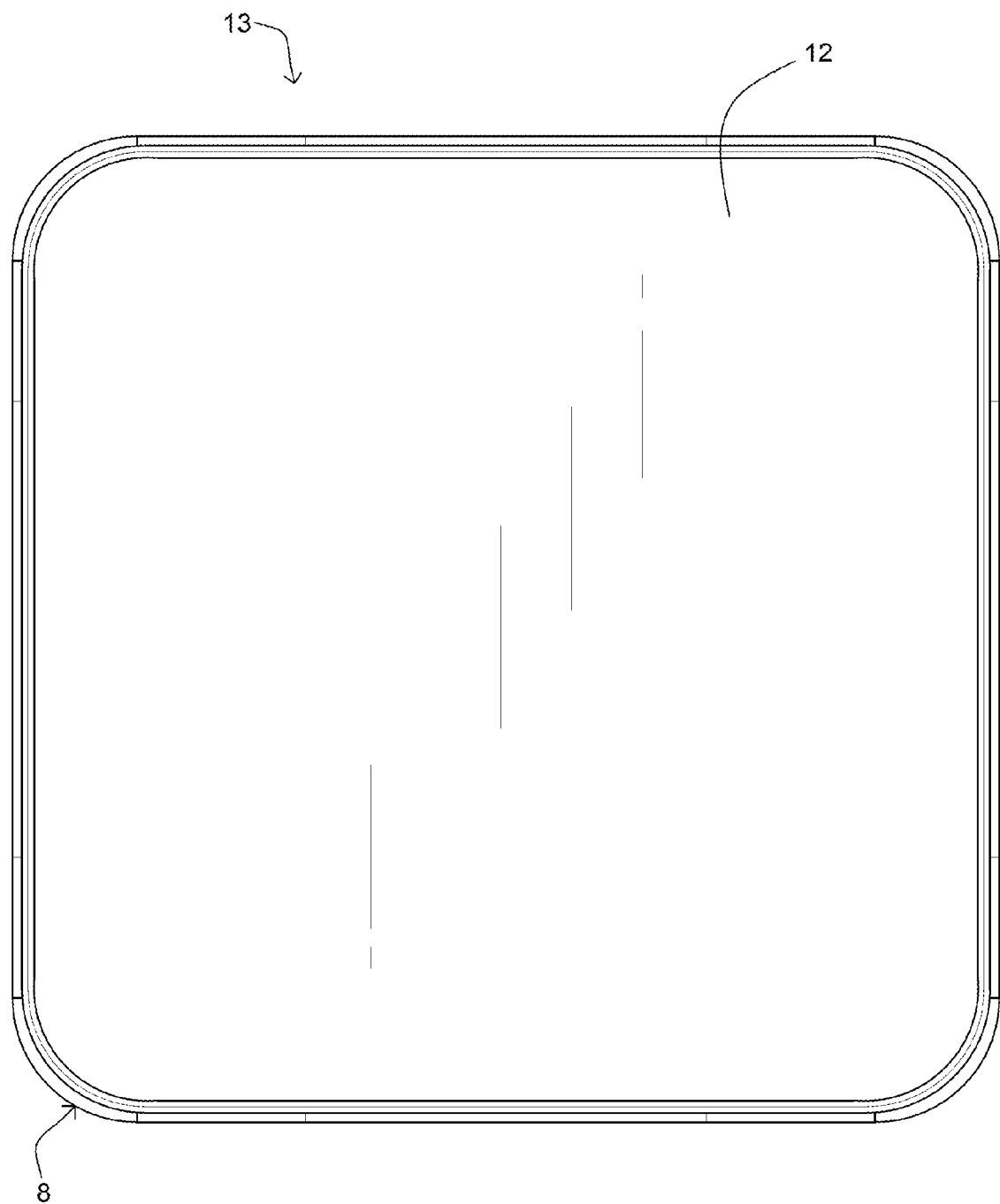
FIG. 1H depicts one embodiment of the bottom view of an improved portable powerbank device with an integrated audio-video content player and display.
Figure 1I:
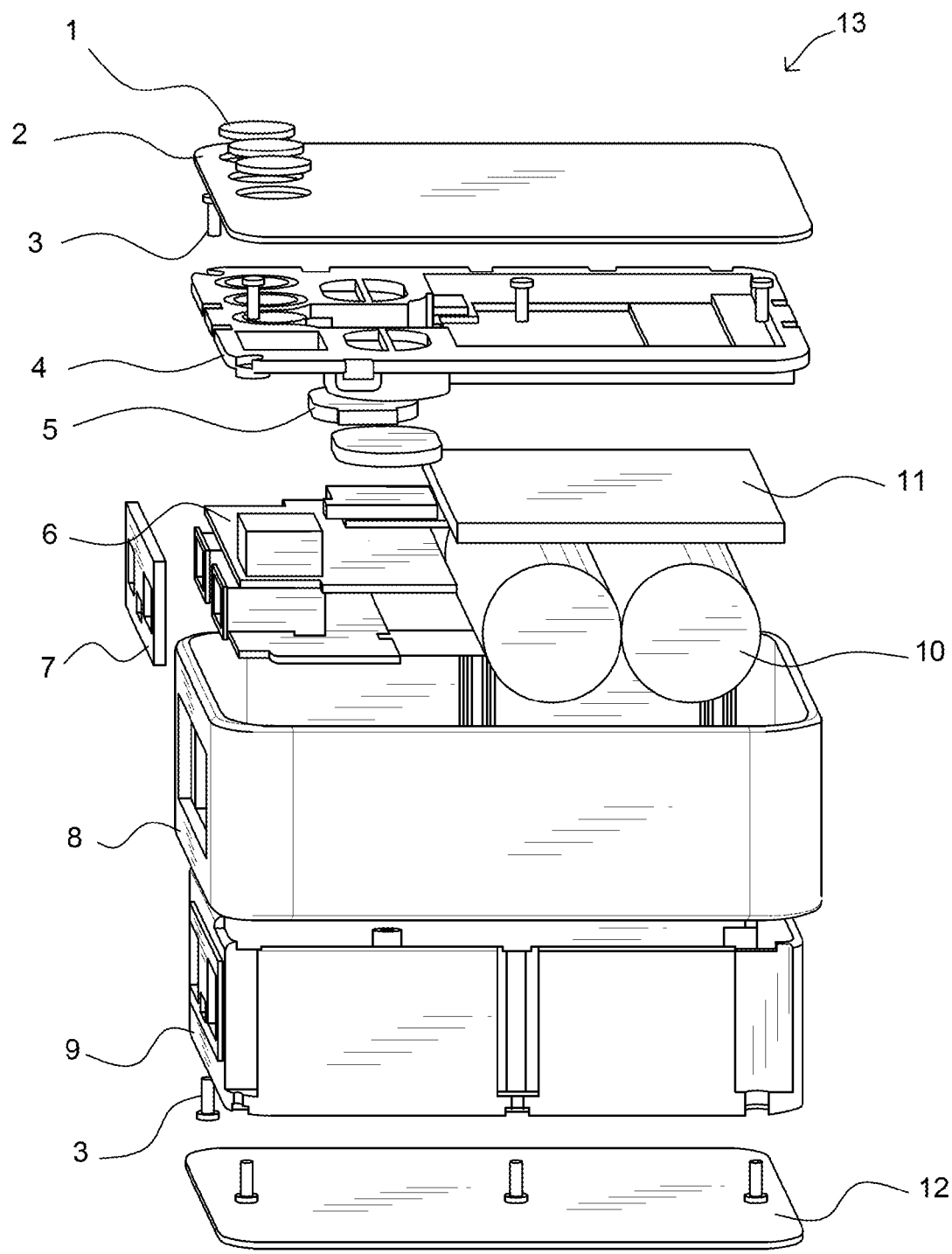
FIG. 1I depicts one embodiment of an exploded view of an improved portable powerbank device with an integrated audio-video content player and display.
Figure 2:
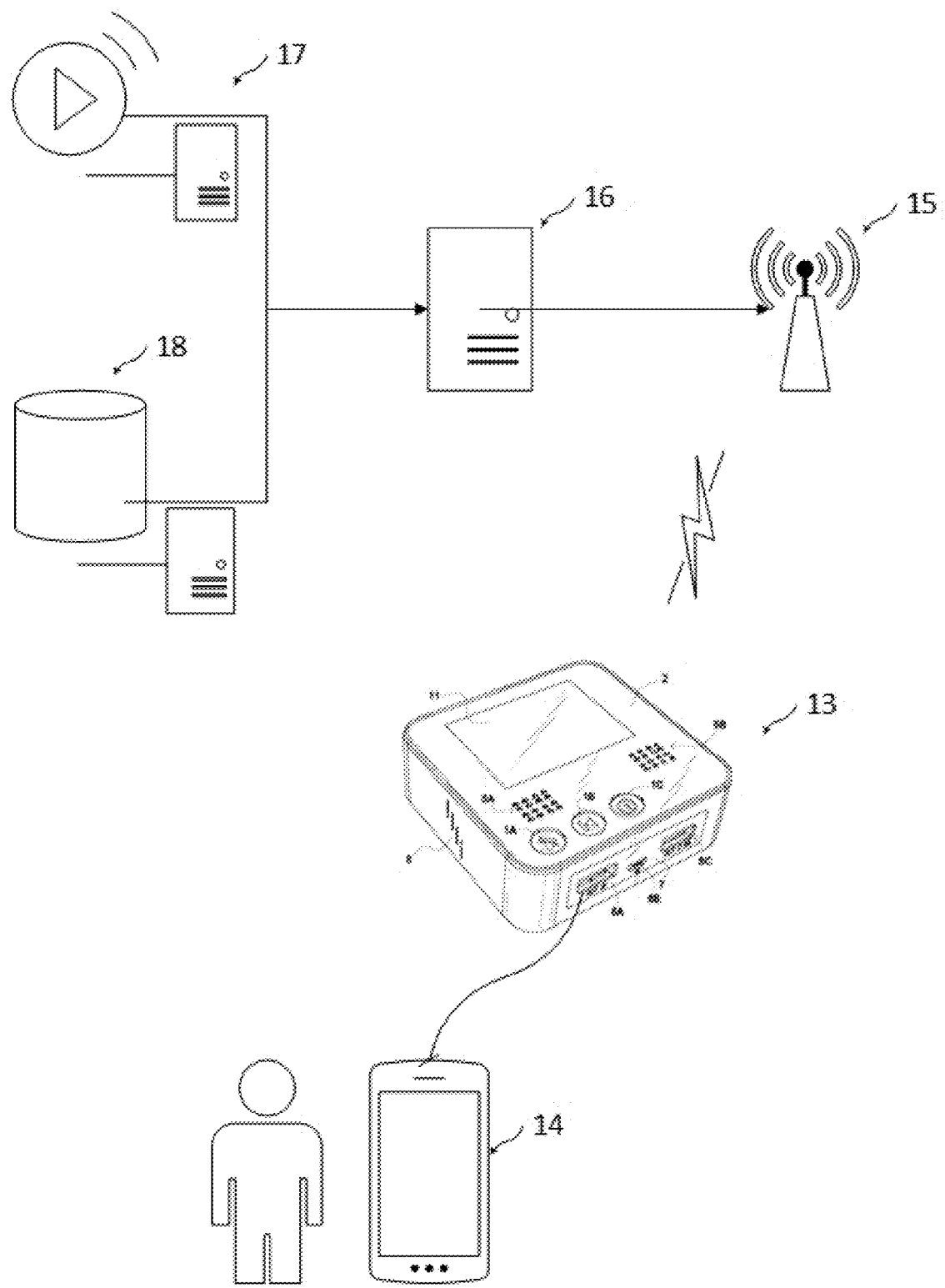
FIG. 2 depicts one embodiment of the relationship within a network and with respect to an end-user of an improved portable powerbank device with an integrated audio-video content player and display while in use in a WiFi-connected mode, as opposed to a stand-alone mode

The inventive disclosures contained herein, including the Specification, the Drawings, and the appended Claims, are generally directed to an improved portable powerbank (or battery bank) that is integrated with video storage and playback/display capabilities for use as a promotional product and/or related services. This integration of the additional media-play capability and related additional functionality represents a major step apart from existing powerbanks, including the many versions of powerbanks used in the promotions industry. Effectively, the improved device is an electronic billboard and/or video player that can keep a user engaged because of a user's motivation to use the powerbank functionality. The improved device is sometimes herein referred to as a "Video-In-Powerbank" ("VIP") or as a "Billboard-In-Powerbank" ("BIP"), or both ("VIP/BIP"), and each use of any of these terms should be construed as including the others, though for simplicity, "VIP" is generally a preferred term.

The combination of the improved powerbank's high user utility with the integrated video/audio player's strong capability in communicating promotional messages, the VIP significantly elevates the promotional effectiveness of each VIP device, as compared with the individual parts of the sum.

In most embodiments, the VIP incorporates control logic that implements one or more strategic algorithms that are designed to enable or disable certain functional capabilities of the VIP in order to encourage end-users to actually watch/listen to promotional video and/or audio media for a predetermined minimum number of VIP operational cycles, which are tracked internally, before releasing certain functional capabilities for end-user use in order to help promotions companies and/or their clients ensure that a VIP given out to end-users is providing a requisite amount of commercial exposure to whatever promotional messages are intended to be communicated to end-users.

Some embodiments have other enhancements, including an incorporated count-down-timer function that is superimposed on the displayed video images, which in turn can be used for event count-down or other functions that require the use of time-tracking.

II. Terminology

The terms and phrases as indicated in quotes (" ") in this Section are intended to have the meaning ascribed to them in this Terminology Section applied to them throughout this document, including the Claims, unless clearly indicated otherwise in context. Further, as applicable, the stated definitions are to apply, regardless of the word or phrase's case, to the singular and plural variations of the defined word or phrase.

The term "or", as used in this Specification, Drawings, and any appended Claims, is not meant to be exclusive; rather, the term is inclusive, meaning "either or both".

References in the Specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of the phrase "in one embodiment" and/or "in one variation" and similar phrases in various places in the Specification are not necessarily all meant to refer to the same embodiment.

The term "couple" or "coupled", as used in this Specification, Drawings, and any appended Claims, refers to either an indirect or a direct connection between the identified elements, components, or objects. Often the manner of the coupling will be related specifically to the manner in which the two coupled elements interact.

The term "removable", "removably coupled", "readily removable", "readily detachable", "detachably coupled", and similar terms, as used in this Specification, Drawings, and any appended Claims, refer to structures that can be uncoupled from an adjoining structure with relative ease (i.e., non-destructively and without a complicated or time-consuming process) and that can also be readily reattached or coupled to the previously adjoining structure.

Directional and/or relational terms such as, but not limited to, left, right, nadir, apex, top, bottom, vertical, horizontal, back, front, lateral, proximal, and distal are relative to each other, are dependent on the specific orientation of an applicable element or article, are used accordingly to aid in the description of the various embodiments, and are not necessarily intended to be construed as limiting in this Specification, Drawings, and any appended Claims.

As applicable, the terms "about" or "generally", as used in this Specification, Drawings, and any appended Claims, unless otherwise indicated, means a margin of +−20%. Also, as applicable, the term "substantially" as used herein unless otherwise indicated means a margin of +−10%. It is to be appreciated that not all uses of the above terms are quantifiable such that the referenced ranges can be applied.

The term "powerbank", as used in this Specification, Drawings, and any appended Claims, refers to any type of portable electrical-energy-storage device that can be used to recharge and/or power portable electronic devices, such as smartphones, tablet computing devices, gaming devices, music-playing devices (e.g., mp3 players), and many other mobile electronic devices. Typically, such a device comprises an internal battery (e.g., a lithium-ion or lithium-polymer battery), onboard circuitry to manage the charge state, and access ports for charging-cable connections (e.g., Universal Serial Bus [USB] connectors). Other similar terms used in the art that can be considered analogous to the term "power bank" include "battery pack", "juice pack", "Mophie®", "portable phone charger", "portable external battery charger", "portable backup battery", and many more.

III. An Improved Portable Powerbank with Integrated Promotional-Media-Play Capabilities This Section III is generally directed to an improved portable powerbank (or battery bank) that is integrated with video storage and playback/display capabilities for use as a promotional product and/or related services. Effectively, the improved device is an electronic billboard and/or video player that can keep a user engaged because of a user's motivation to use the powerbank functionality. For simplicity, the improved device is sometimes herein referred to as a "Video-In-Powerbank" ("VIP") or as a "Billboard-In-Powerbank" ("BIP"), or both ("VIP/BIP"). Refer to FIGS. 1A through 1I, 2, 4A, 4B-1 through 4B-8, and 4C-1 through 4C-5, which depict an embodiment of the VIP 13 structural-implementation details and an embodiment of the relationship between a VIP 13 and a host network 15, 16, 17, 18 and end-user mobile-computing device 14.

The combined aforementioned utilities of the VIP 13 provides a convenient vehicle for encouraging end-users to view communicated promotional messages in exchange for the use of the VIP's 13 charging capability, as well as any post-promotional message video and/or audio media play (i.e., entertainment media play) in some embodiments.

In an embodiment, the VIP 13 typically is fabricated in a substantially rounded-rectangular form factor, wherein the casing 2, 8, 12 is largely comprised of aluminum, aluminum alloy, hard plastic, or other suitable light-weight and strong materials. On the top surface 2, various controls and displays are provided, such as a display window 11 (typically an LCD display), at least one speaker 5, 5A, 5B, and three control buttons 1A, 1B, 1C. One control button 1C allows a user to power ON or power OFF the VIP 13. Another control button 1B allows a user to control the pausing and navigation through media being played, though in most embodiment, this functionality is strategically limited to the standard functions of PLAY, PAUSE, and FAST-FORWARD (that is, there is no REWIND functionality). The third control button 1A provides a means for a user to MUTE the VIP's 13 sound and/or adjust the volume of the media play. Finally, in some variations, an additional LCD or LED display 4A is provided to display to an end-user how many usage cycles the VIP 13 has been through since the last resetting of its "Activation Count" registry within the onboard memory 6.

In variations of the VIP 13, a plurality of USB ports 6A, 6B, 6C are disposed within a display lens 7. In many embodiments, two of the USB ports 6A, 6C are Type-A USB ports, at least one of which supports both power and data transmission, and have output current ratings of at least 1.0 ADC to 2.0 ADC, typically at a voltage in the range of 3.7 VDC to 5.0 VDC to support most smart electronic devices to be charged. In addition, the third USB port 6B is commonly a "mini-USB" port (often a "mini-B" USB port) is adapted to allow the charging of the VIP 13 from an external source.

Internally, in many embodiments, the VIP 13 is additionally comprised of a light-weight inner frame, typically comprised of a sturdy, but inexpensive plastic, though other materials can be used, and a plurality of fasteners 3 (typically threaded fasteners, but not limited to such) to hold the various enclosure components 2, 4, 7, 8, 9, 11, 12 together. In most variations, the VIP 13 further comprises one or more rechargeable batteries 10, typically lithium-polymer or lithium-ion batteries, though other existing or emergent battery technologies can be used. Because of the likelihood that in many applications the VIP 13 will need to facilitate the recharging of several, if not many, mobile-electronic devices 14 between recharges of the VIP 13, a relatively high capacity for the one or more rechargeable batteries is preferred. For example, a 5000 mAH powerbank in new condition, and depending on factors such as ambient temperature, can probably support the fully recharging of a battery-depleted iPhone 6® at least two times, perhaps a bit more. In preferred embodiments, the VIP's 13 batteries 10 will be rated at least for 10,000 mAH to support the recharging of four to five smartphones between full recharging of the VIP 13. In situations where a high level of relatively quick reuse of a VIP 13 is anticipated; e.g., a restaurant owning a plurality of VIP 13 devices equipped with pager capabilities for use in managing table-wait queues might need each VIP 13 to have a minimum charging-output capacity of at least 20,000 mAH—in addition to the power required to operate the VIP's 13 other functionalities, such as media play, since the restaurant's VIPs 13 will likely be used by many customers in a day to charge their respective mobile-electronic devices 14 that are in various initial states of charge and such VIPs 13 may not get recharged until after the close of business for each day.

In standard embodiments, the control center of the VIP 13 is disposed on at least one printed circuit board 6, on which all of the control-logic components to manage on-board volatile and non-volatile memory, WiFi and/or USB-cable connectivity, media-file download/upload capabilities, the displays and speakers, charge and discharge states, and the like. FIGS. 4A, 4B-1 through 4B-8, and 4C-1 through 4C-5 provide one embodiment of a typical physical component layout of components on the printed circuit board 6, as well as some typical control-logic circuitry, respectively.

The printed circuit board 6 features onboard programmable logic components, such as a microcontroller or Field-Programmable Gate Arrays (FPGA), though those skilled in the art would immediately appreciate that numerous alternative control-logic-implementation devices known in the art can also be used; e.g., Application-Specific Integrated Circuits (APIC), etc. Such programmable logic components are essential for the VIP 13 to be able to perform certain key functionalities that are discussed later in this Specification, and, in many embodiments, are reprogrammable.

In some embodiments, the VIP 13 is adapted to communicate with a network via WiFi, which enables the VIP 13 to be used in a variety of ways by a user. For example, a WiFi connection for the VIP 13 better facilitates the ability for a promotions company that is giving out or lending VIPs 13 to provide on-the-fly customization of promotional video and/or audio from its network 15, 16, 17, 18, which is typically comprised of a plurality of servers, including a media server 17 and a database server 18. Further, such wireless connectivity for VIP devices 13 enable the gathering of usage data, which can be useful in adjusting the end-user experience, depending on a variety factors such as the number of VIP-activity sessions, length of usage, location data, and the current date and time.

In still more embodiments, when the VIP 13 is connected to an end-user mobile-computing device 14 such as a smartphone or tablet computer via a USB cable connected to one of the Type-A USB ports that support data communications 6C, the end-user will be prompted to provide permission on his or her device to allow the VIP 13 access to the files of the end-user's mobile device 14 in order for the VIP 13 to play media files that are resident on the end-user's mobile device 14 and/or allow the streaming of media from the end-user's mobile device 14 onto the VIP 13. In some variations, this "Multimedia-Management" functionality is only enabled within the VIP 13 after the VIP 13 has been used/activated to play its promotional materials at least a predetermined number of times in order to help motivate the end-user to watch/listen to the promotional messages enough times to meet the promotional goals of the company providing the VIP 13.

In even more embodiments, the VIP's 13 "on-module" controls 1A, 1B, 1C provide for audio volume and mute control—allowing users to adjust for the amount of "promotional presence" when the VIP 13 is in use. In variations, the Mute functionality is only enabled after the VIP 13 has been used/activated to play its promotional materials at least a predetermined number of times before allowing an end-user in order to help motivate the end-user to watch/listen to the promotional messages enough times to meet the promotional goals of the company providing the VIP 13. In some cases, the Mute functionality is merely enabled when the minimum number of VIP 13 competed play cycles have occurred in order to allow an end-user to employ the MUTE button 1A. In other cases, after the minimum number of VIP 13 competed play cycles have occurred, the Mute functionality is both enabled and automatically employed upon the startup of the VIP 13.

Additional variations include an incorporated countdown-timer function that is super-imposed on the displayed video images, which in turn can be used for event countdown or other functions that require the use of time-tracking.

IV. Detailed Functional Operations of an Improved Portable Powerbank with Integrated Promotional-Media-Play Capabilities This Section IV is generally directed to several embedded functional processes within various embodiments of an improved portable powerbank (or battery bank) that is integrated with video storage and playback/display capabilities for use as a promotional product and/or related services. Refer to FIGS. 3A through 3I, as well as FIGS. 1A through 1I, 2, 4A, 4B-1 through 4B-8, and 4C-1 through 4C-5.

In some embodiments, the VIP 13 incorporates an automatic update/refresh of the media-playback content through the wireless connectivity (WiFi) of a host mobile-electronic device 14 (e.g., smartphone, tablet computer, etc.) as it is being charged. In variations, the VIP 13 can provide proximity-based and/or location-based playback content as the mobile-electronic device 14 is being serviced by the charger portion of the VIP 13. Moreover, still more variations facilitate the provision of time-based content; for example, a "reminder message" after one year of use to refresh customer-vendor engagement relationship.

Some enhancements also allow for the qualification of additional promotional items after certain usage thresholds; for example, by the frequency or total number of VIP 13 charges/charge cycles or by the total number of amperehours of charge/electrical energy used, as recorded into a VIP's 13 non-volatile memory 6. In turn, this encourages utilization of the VIP 13, which promotes brand promotion and transfer. In additional embodiments, the wireless functionality of a host mobile-electronic device 14 being serviced by the charger portion of the VIP 13 is leveraged by the VIP 13 for communications with the Internet and/or back-end servers 15, 16, 17, 18.

In some variations, the VIP 13 allows users to add the users' own content and/or other customization features after a certain time and/or frequency of use, as a consumer incentive/reward for watching and/or listening to promotional video/content while using the charging utility of the VIP 13. In related embodiments, the VIP 13 provides a user the capability of launching web-based applications (such as social media or content playback) on the mobile-electronic device being serviced by the charger portion of the VIP 13.

In even more embodiments, the VIP 13 incorporates time-based and/or remote configurable enable/disable functions in order to discourage users from "walking away" with the VIP 13 device. In other variations, the VIP 13 further incorporates a wireless pager capability, which is particularly useful for businesses that may want to hand out VIPs 13 to customers who are in a wait queue for services or products, and the VIP 13 notifies the customer by way of an incorporated vibration member (not shown) and/or other audio/visual indications that the customer's wait time is over; e.g., a restaurant's customers waiting to be seated.

Figure 3A:
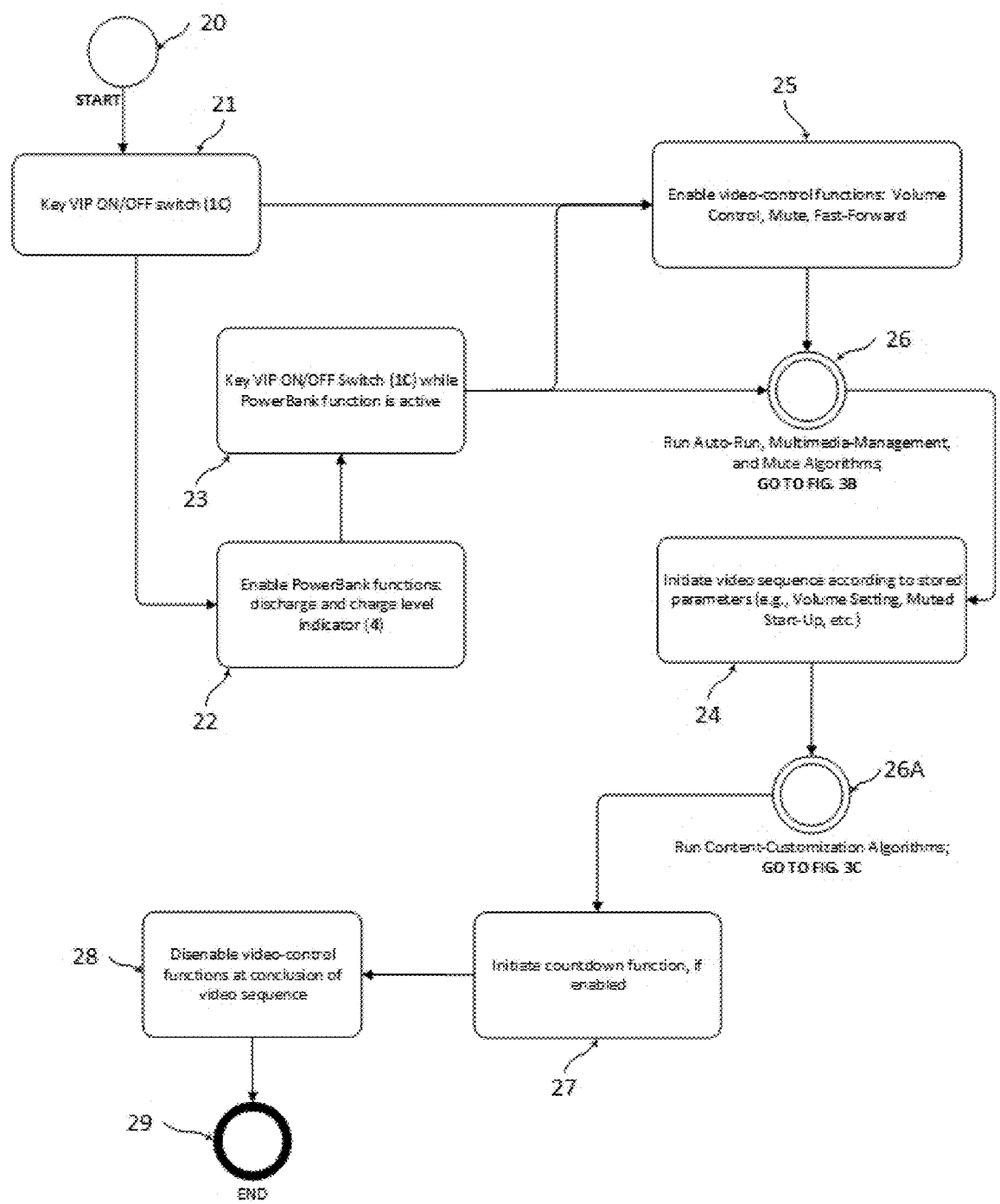
FIG. 3A depicts one embodiment of an example top-level functional flow diagram for an improved portable powerbank device with an integrated audio-video content player and display, in which the logic flow governs the startup and internal programmatic setups, some of which make use of some of the functional-flow diagrams in FIGS. 3B-3L described below.

Referring specifically to FIG. 3A, in one embodiment, the VIP 13 has an ON/OFF switch/button 1C, which when engaged by an end-user 21 to turn the VIP 13 ON, enables the powerbank functions 22; that is, the charge and discharge level indicator and management 4, 4A. At the same time, the ON/OFF switch/button 1C enables the video/audio-control functions 25 (e.g., volume/mute controls, fast-forward/rewind, etc.), then initiates the promotional-video/audio sequence 24. In variations, if enabled, the countdown function 27 is enabled. Finally, in some embodiments, at the end of the video sequence 28, the video/audio-control functions 25 are disabled, and the end-user can continue to use the VIP 13 to supply/recharge their connected mobile electronic devices 14.

Figure 3B:
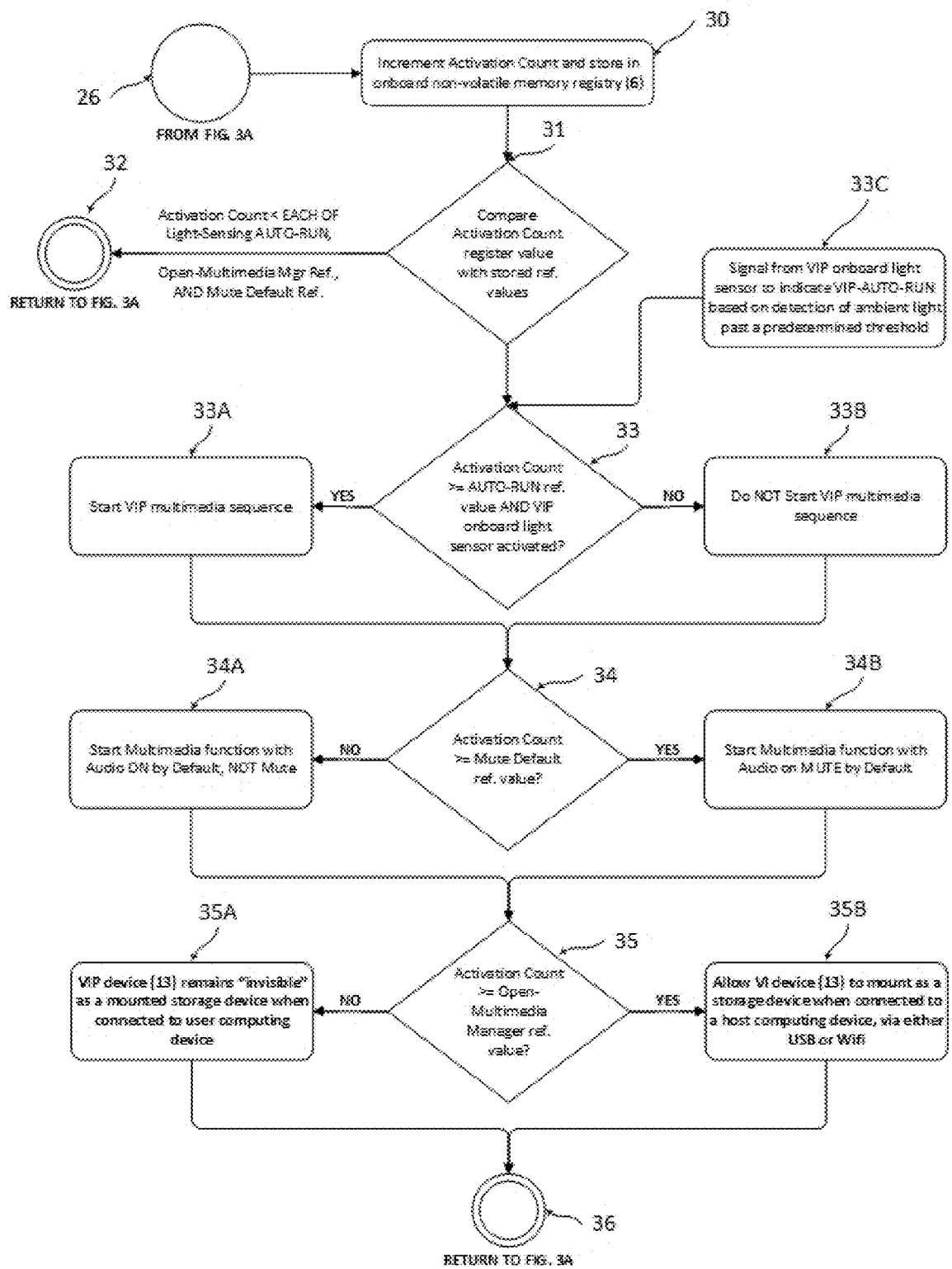
FIG. 3B depicts one embodiment of an example functional flow diagram for an improved portable powerbank device with an integrated audio-video content player and display in which the device cycles through a series of checks of register values corresponding to usage history that are stored in non-volatile memory so that the device's logic circuits can determine whether: (a) to allow an AUTO-RUN device startup upon detection of ambient light (for devices equipped with an associated light sensor) past a threshold to cause the device to startup upon removing the device from its packaging; (b) to allow the device to startup in a MUTE mode during the promotional message/video before any other media is played; and/or (c) to allow the device to be connected to a mobile-computing device (e.g., a smartphone or a tablet computer) and access files on the host mobile-computing device.
Figure 3C:
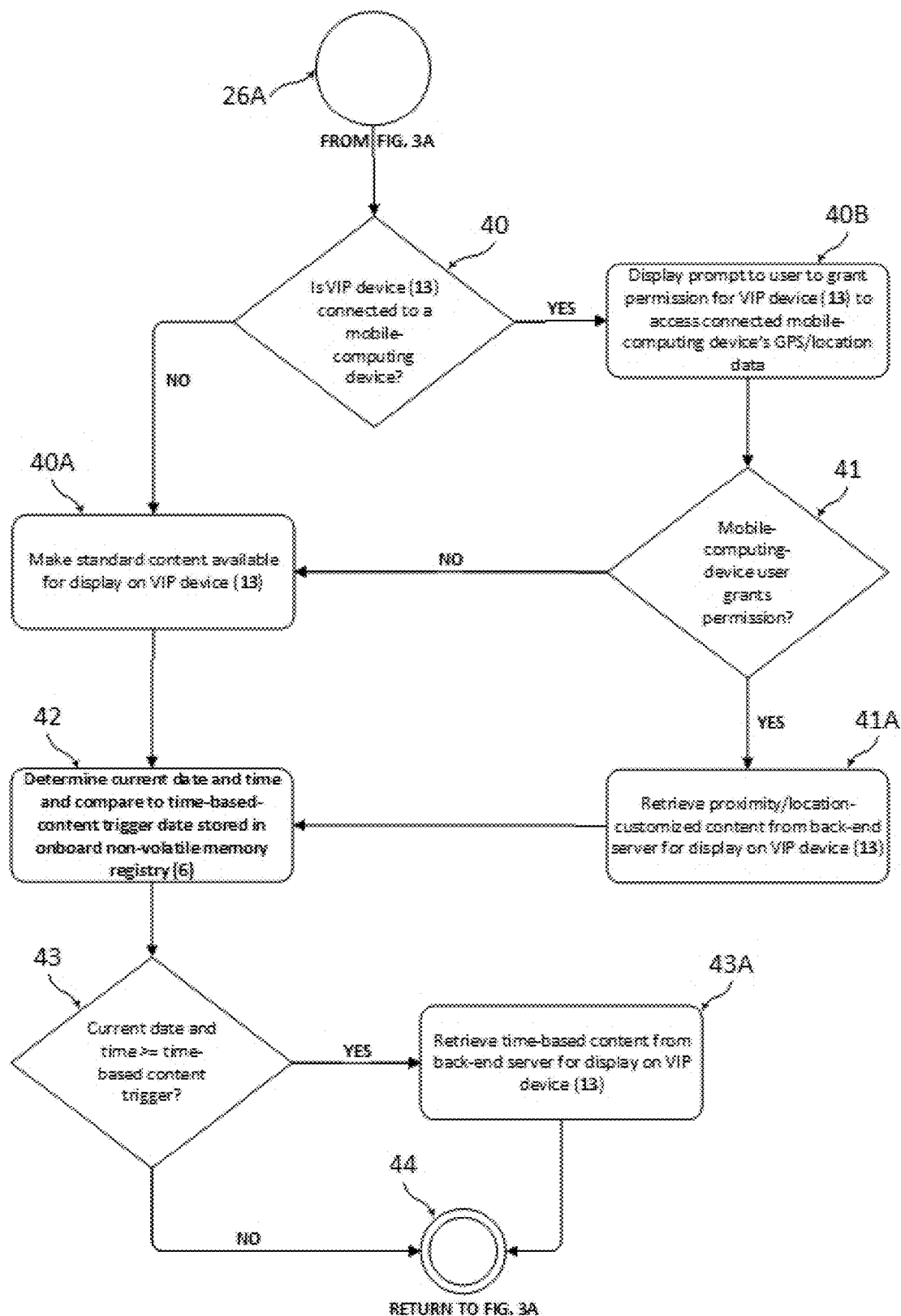
FIG. 3C depicts one embodiment of an example functional flow diagram for an improved portable powerbank device with an integrated audio-video content player and display in which the device checks to see if it is connected to a host mobile-computing device and if so, then runs a routine to determine whether the device can access and use the mobile-computing device's GPS and/or location-detection capabilities so that the device can provide proximity/location-based content to an end-user. In addition, the functional-flow diagram also checks to see if the current date and time, as compared to stored data, should trigger the device to play and display time-based content to an end-user.
Figure 3D:
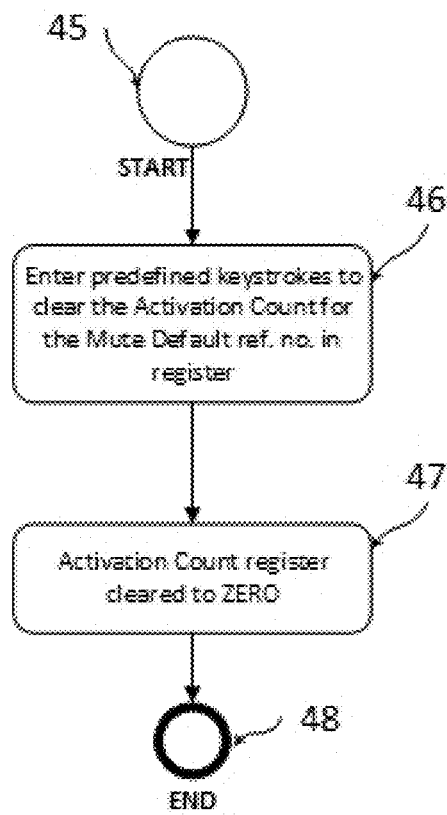
FIGS. 3D and 3E depict, respectively, one embodiment of the method to clear the Activation Counter register for the Mute Default functionality to ZERO for an improved portable powerbank device with an integrated audio-video content player and display using user-input keystroke, as well as one embodiment of a method to set the Activation Counter register to a value that will cause the activation of the Mute Default functionality.
Figure 3E:
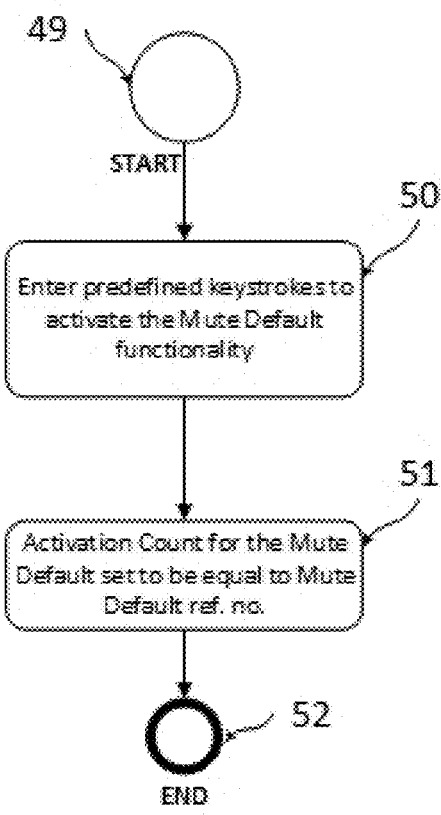
Figure 3F:
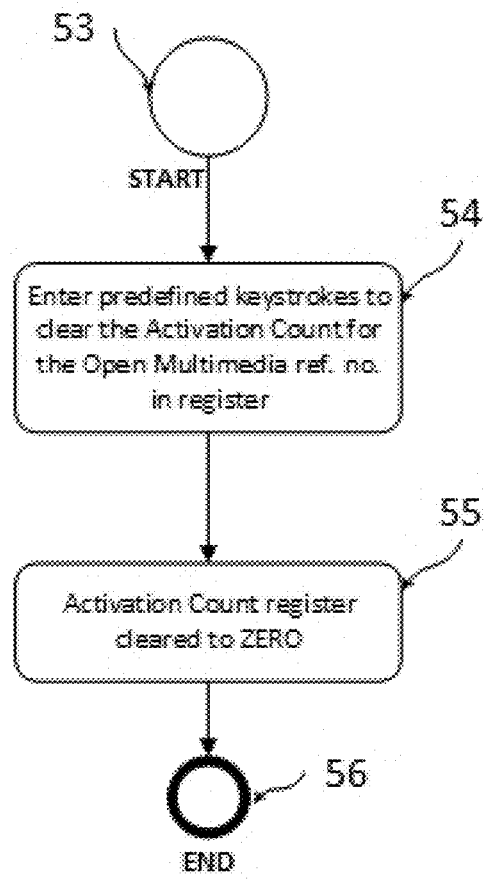
FIGS. 3F and 3G depict, respectively, one embodiment of the method to clear the Activation Counter register for the Open Multimedia functionality to ZERO for an improved portable powerbank device with an integrated audio-video content player and display using user-input keystroke, as well as one embodiment of a method to set the Activation Counter register to a value that will cause the activation of the Open Multimedia functionality.
Figure 3G:
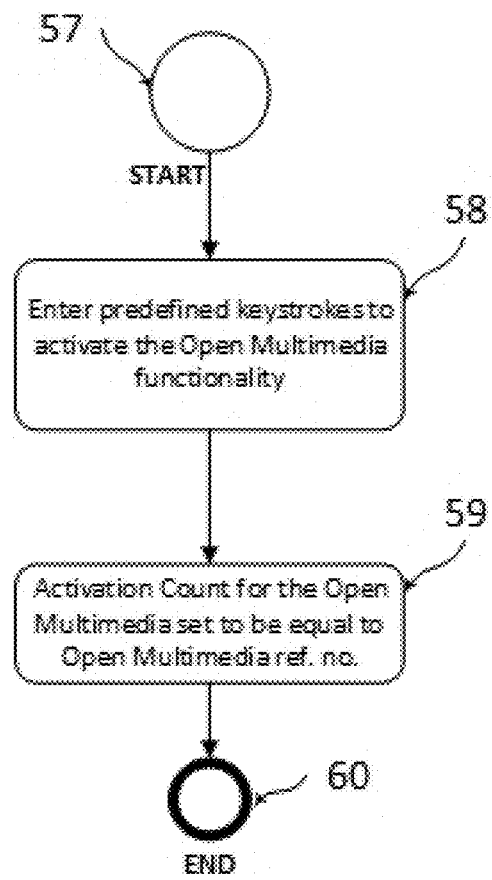
Figure 3H:
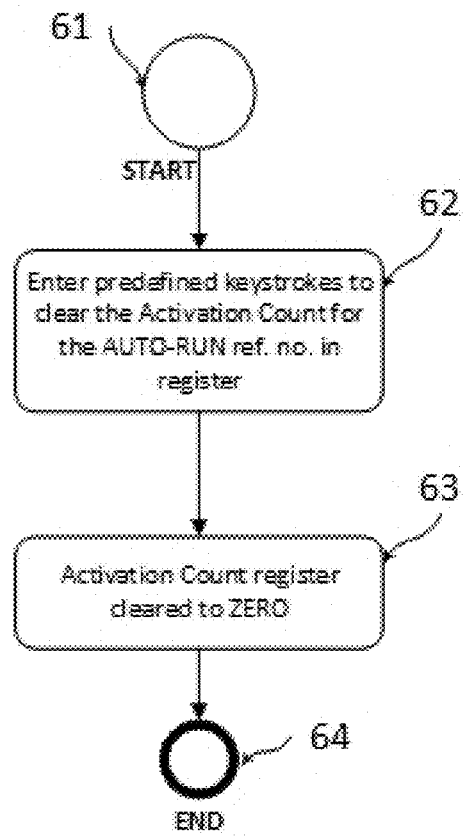
FIGS. 3H and 3I depict, respectively, one embodiment of the method to clear the Activation Counter register for the AUTO-RUN functionality to ZERO for an improved portable powerbank device with an integrated audio-video content player and display using user-input keystroke, as well as one embodiment of a method to set the Activation Counter register to a value that will cause the activation of the AUTO-RUN functionality.
Figure 3I:
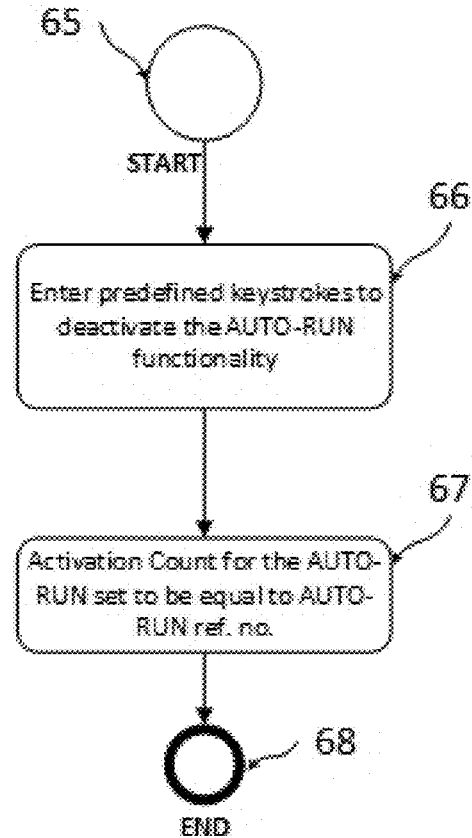
Figure 4A:
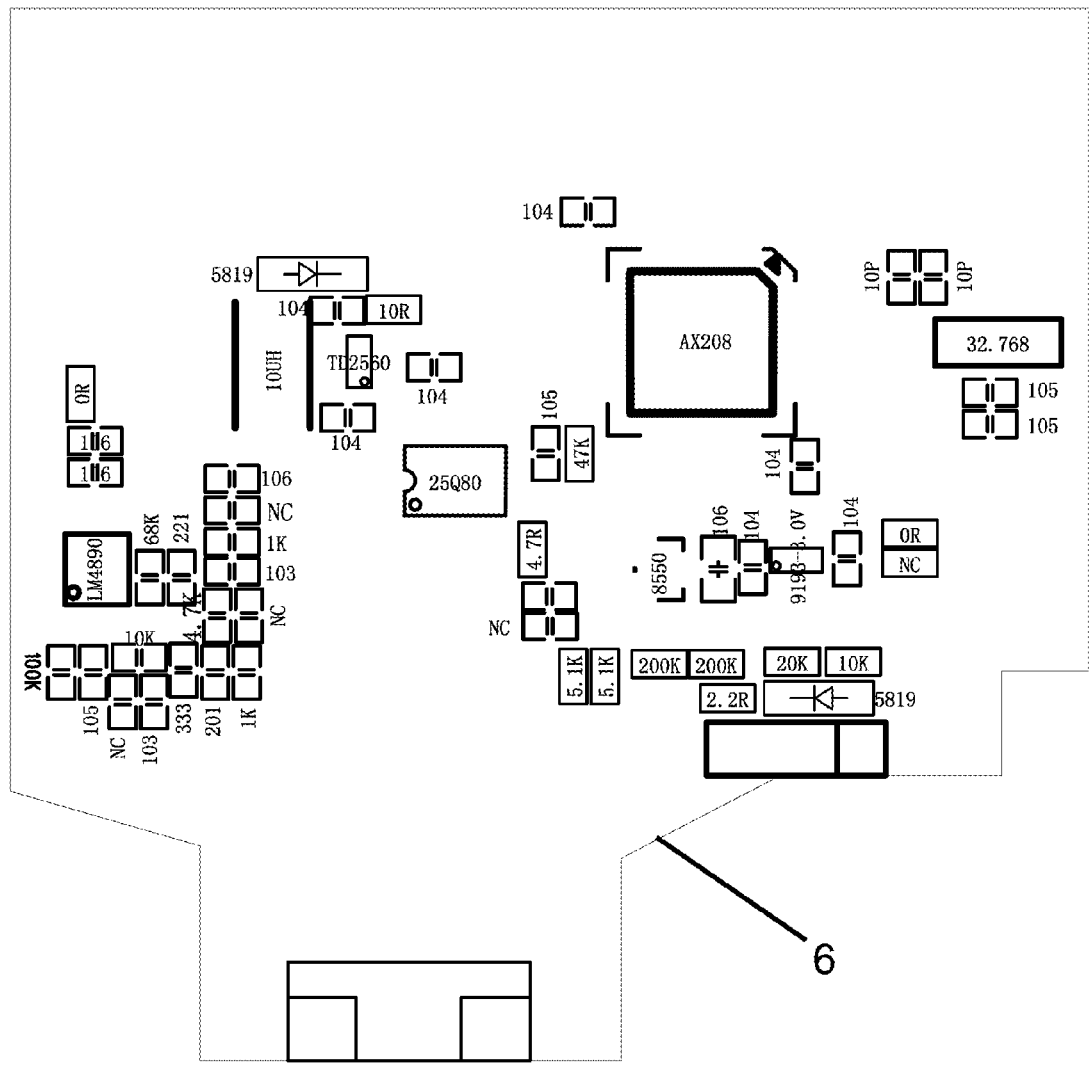
FIG. 4A depicts one embodiment of a physical layout for the main printed circuit board assembly for an improved portable powerbank device with an integrated audio-video content player and display, said printed circuit board containing volatile and non-volatile memory, WiFi functionality (if so equipped), and other control-logic components.
Figure 4B:
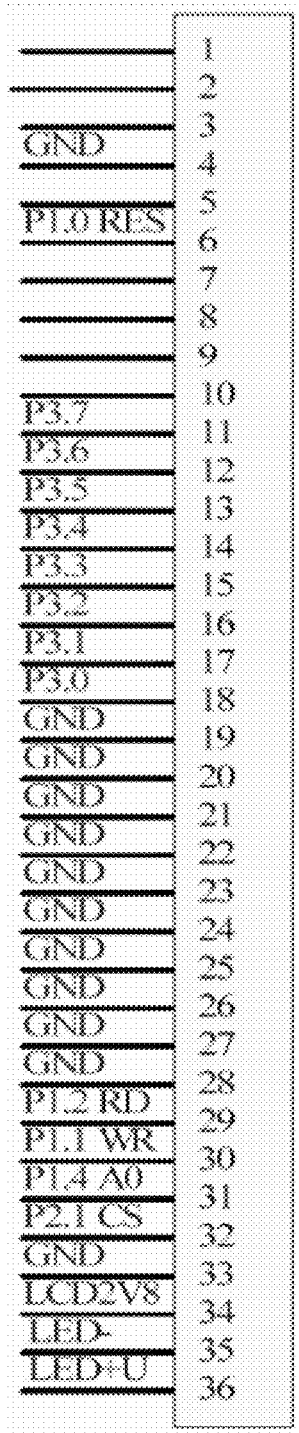
FIGS. 4B-1 through 4B-8 depicts one embodiment of detailed circuit diagrams employed for a printed circuit board for an improved portable powerbank device with an integrated audio-video content player and display.
Figure 1:
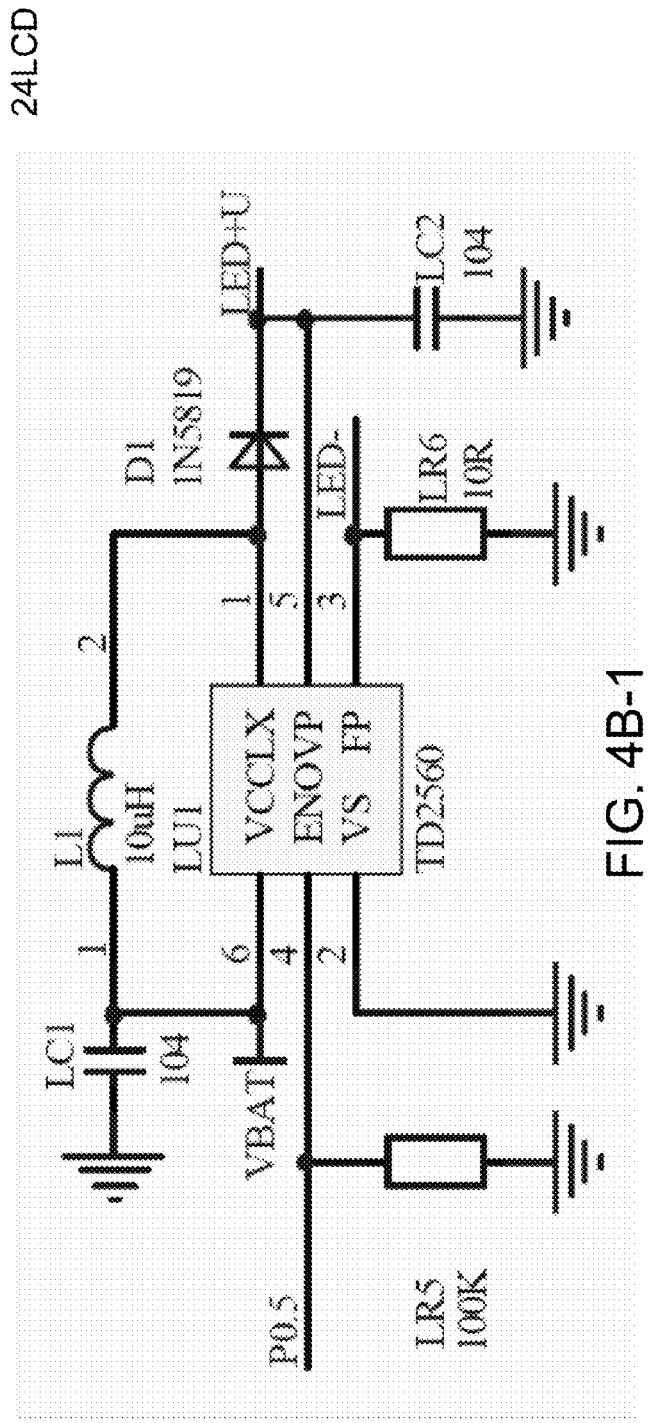
Figures 2, 4B:
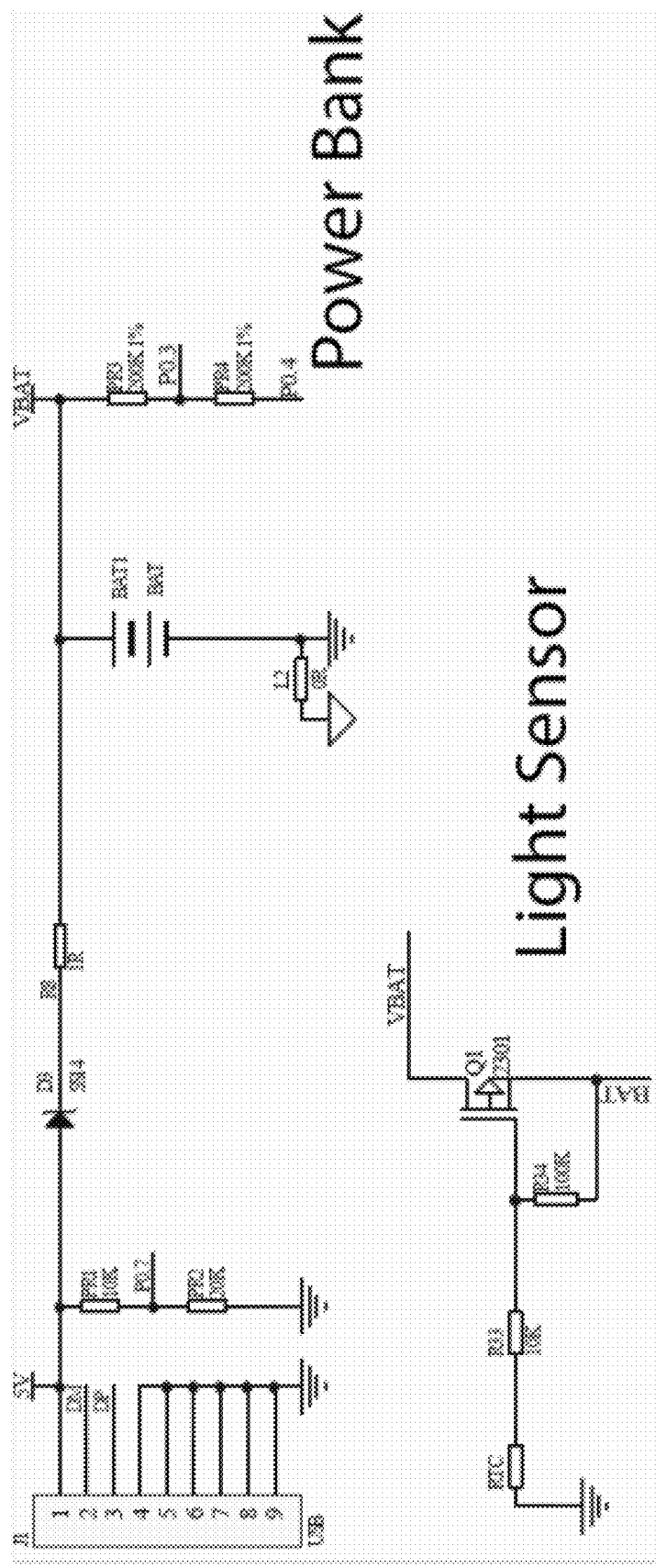
Figures 3, 4B:
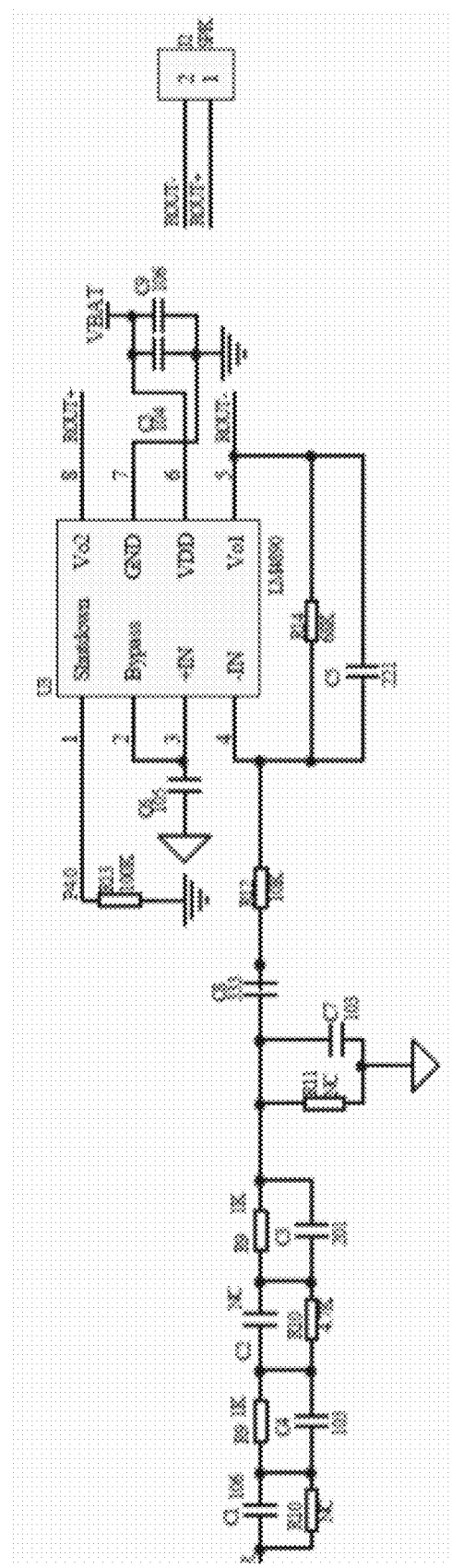
Figures 4, 4B:
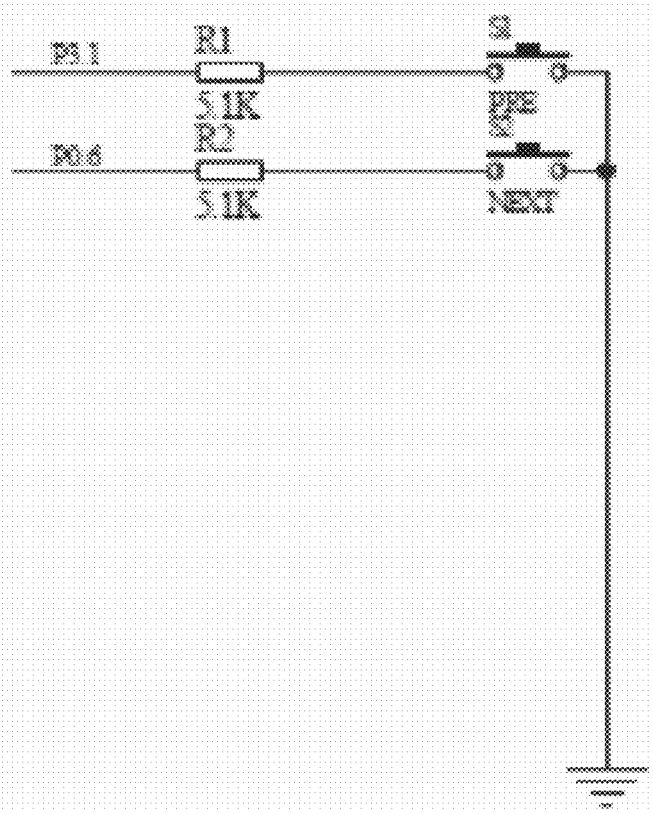
Figures 4, 4B, 5:
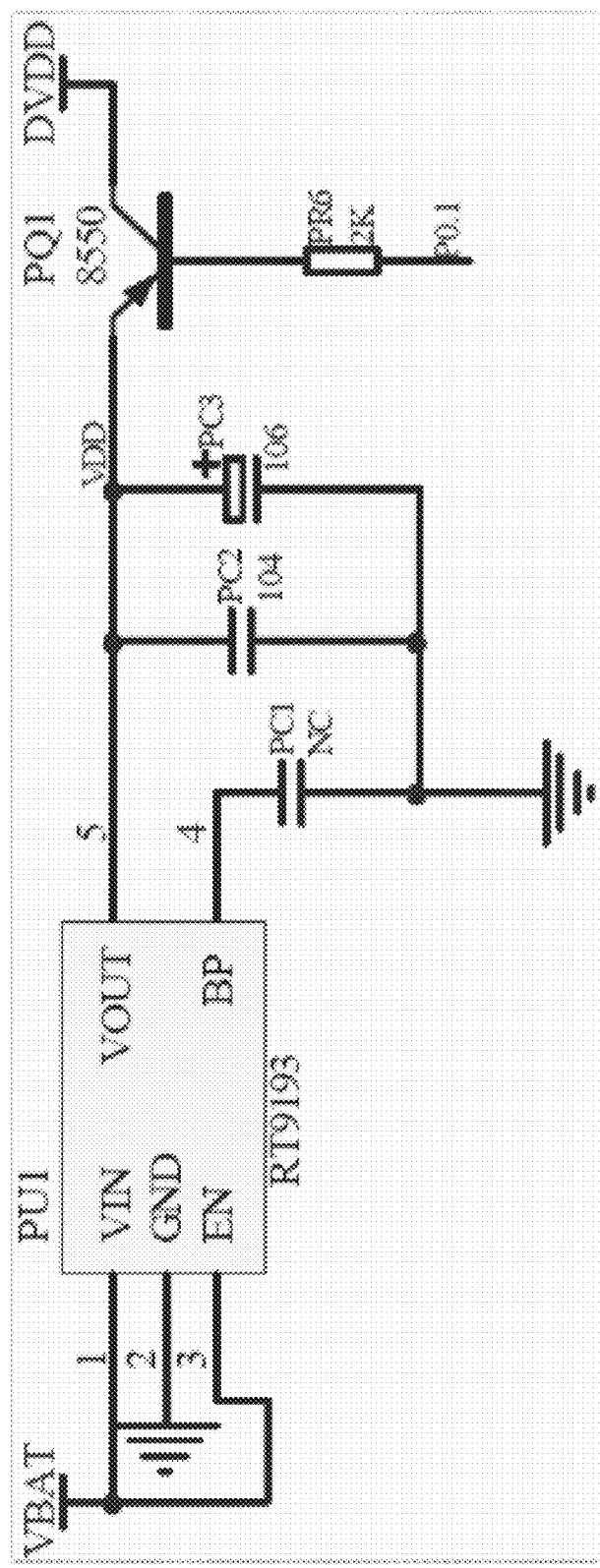
Figures 4, 4B, 5, 6:
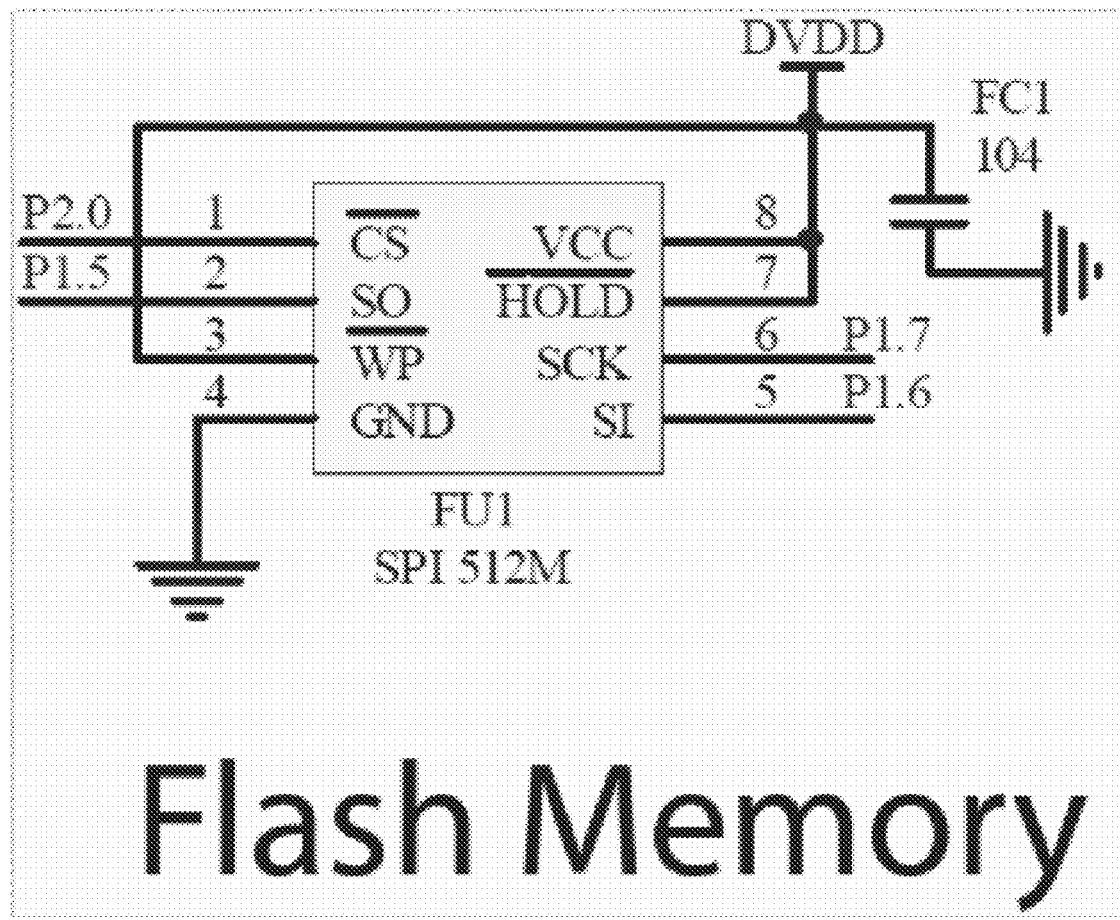
Figures 4, 4B, 5, 6, 7:
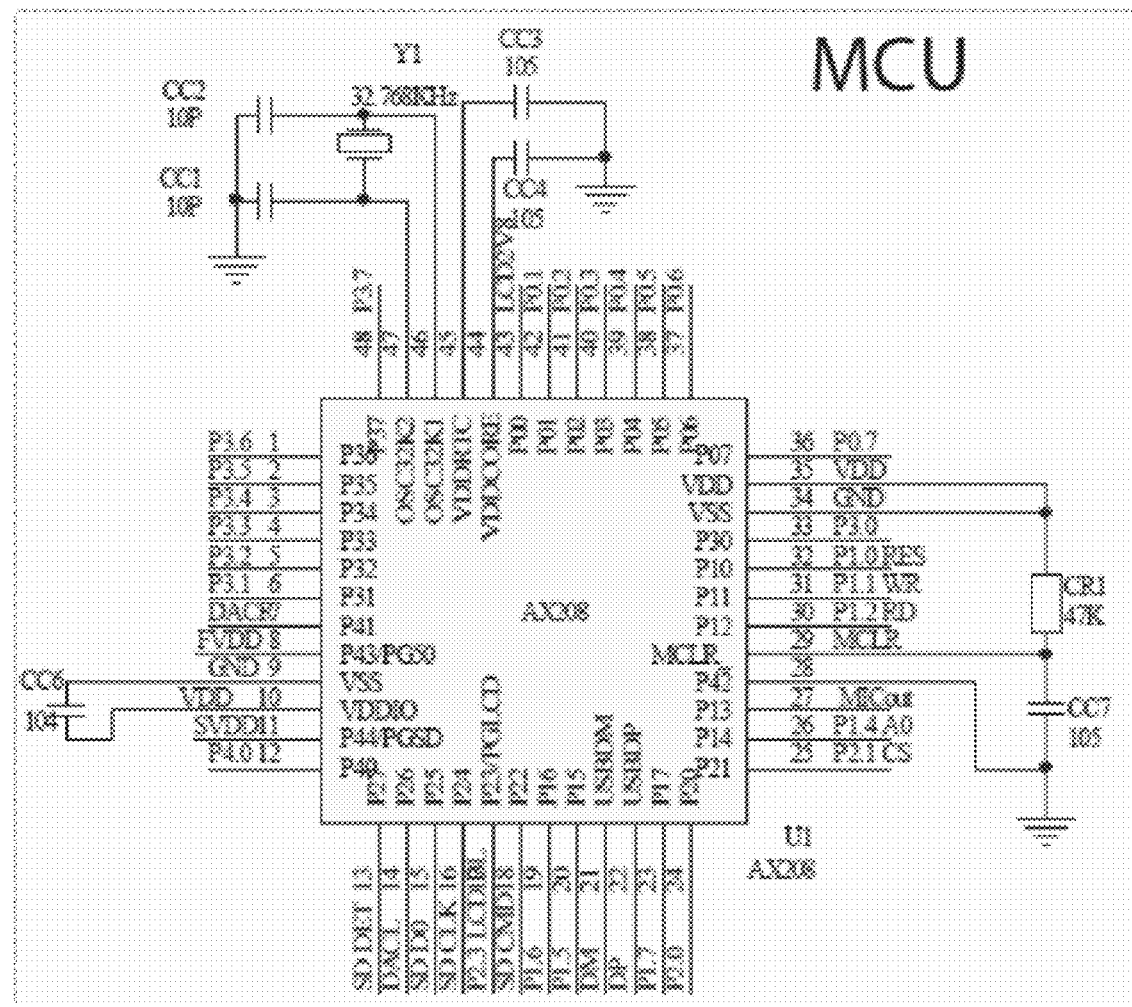
Figures 4, 4B, 5, 6, 7, 8:
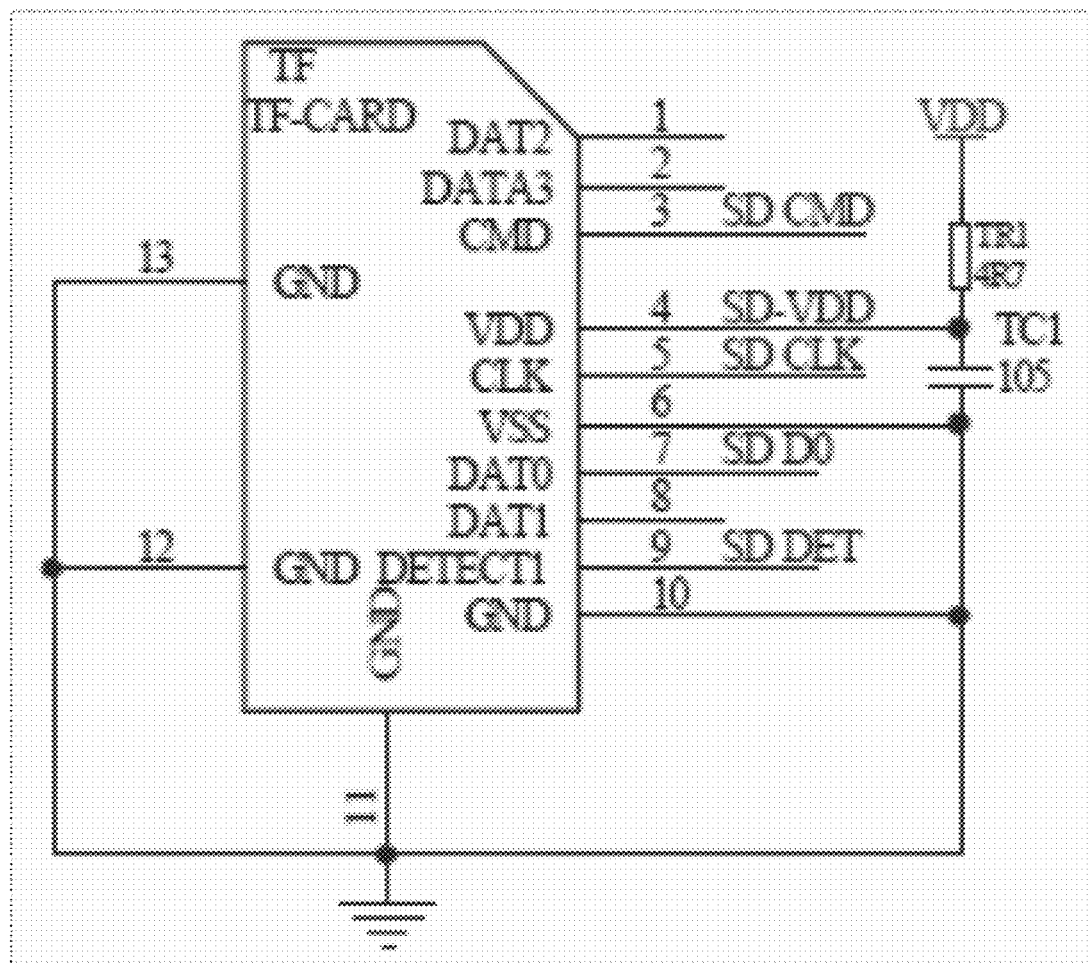
Figures 1, 4C:
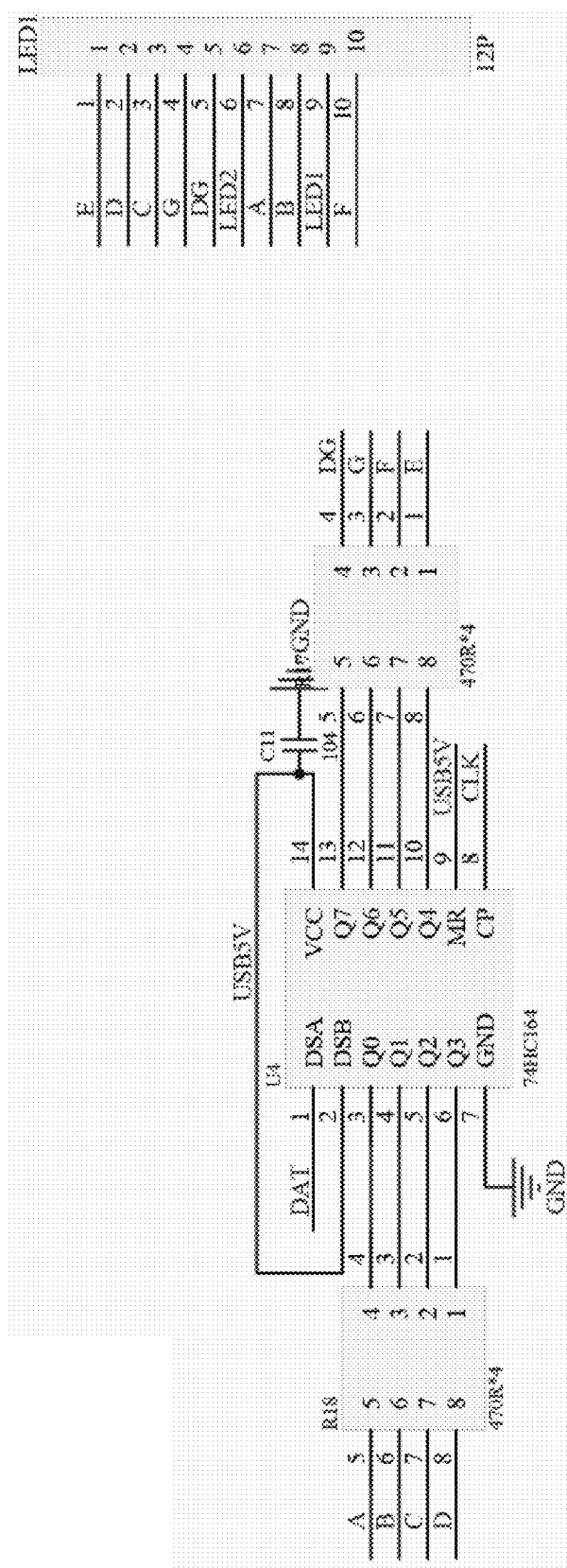
Figures 2, 4C:
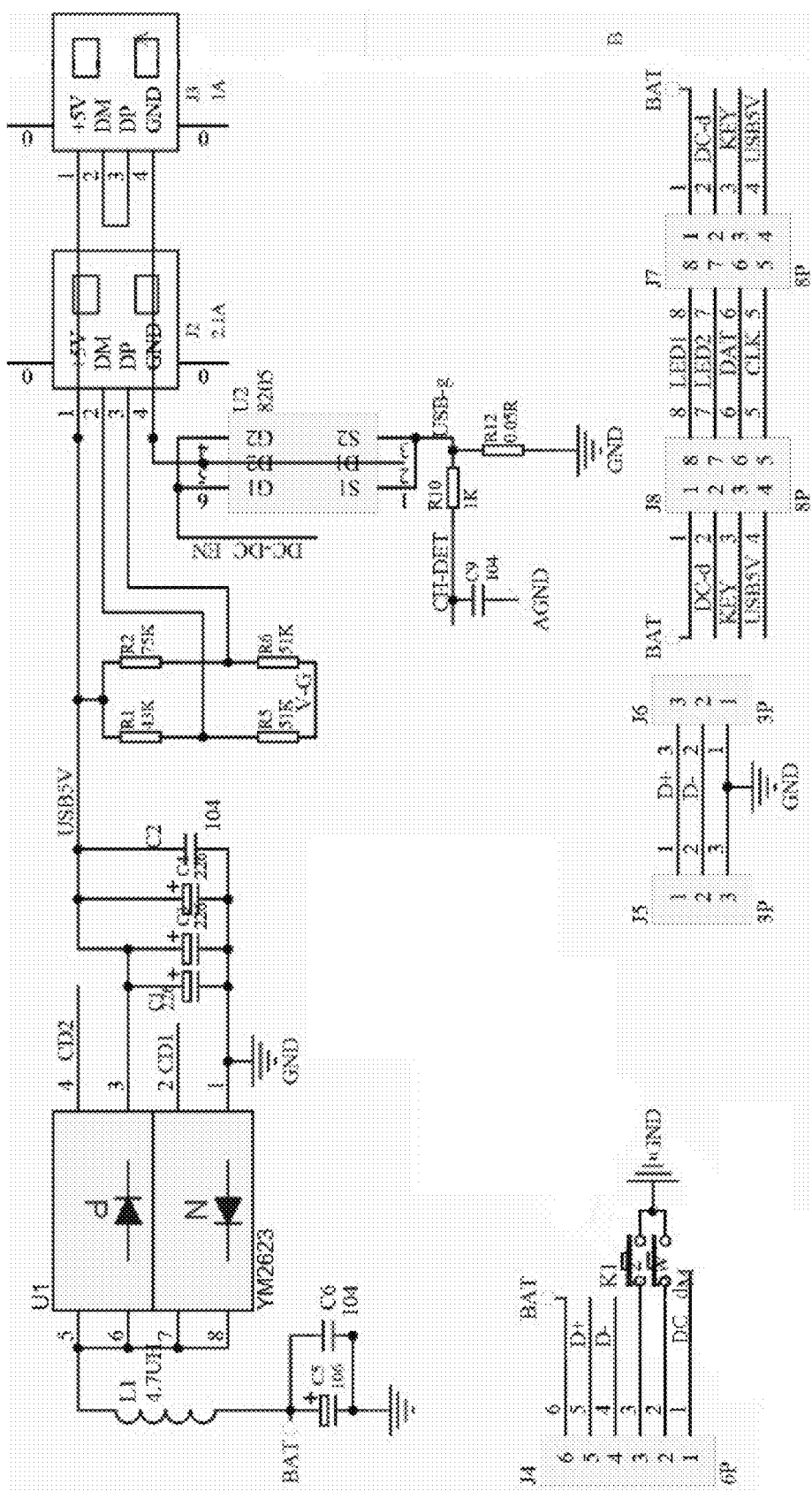
Figures 3, 4C:
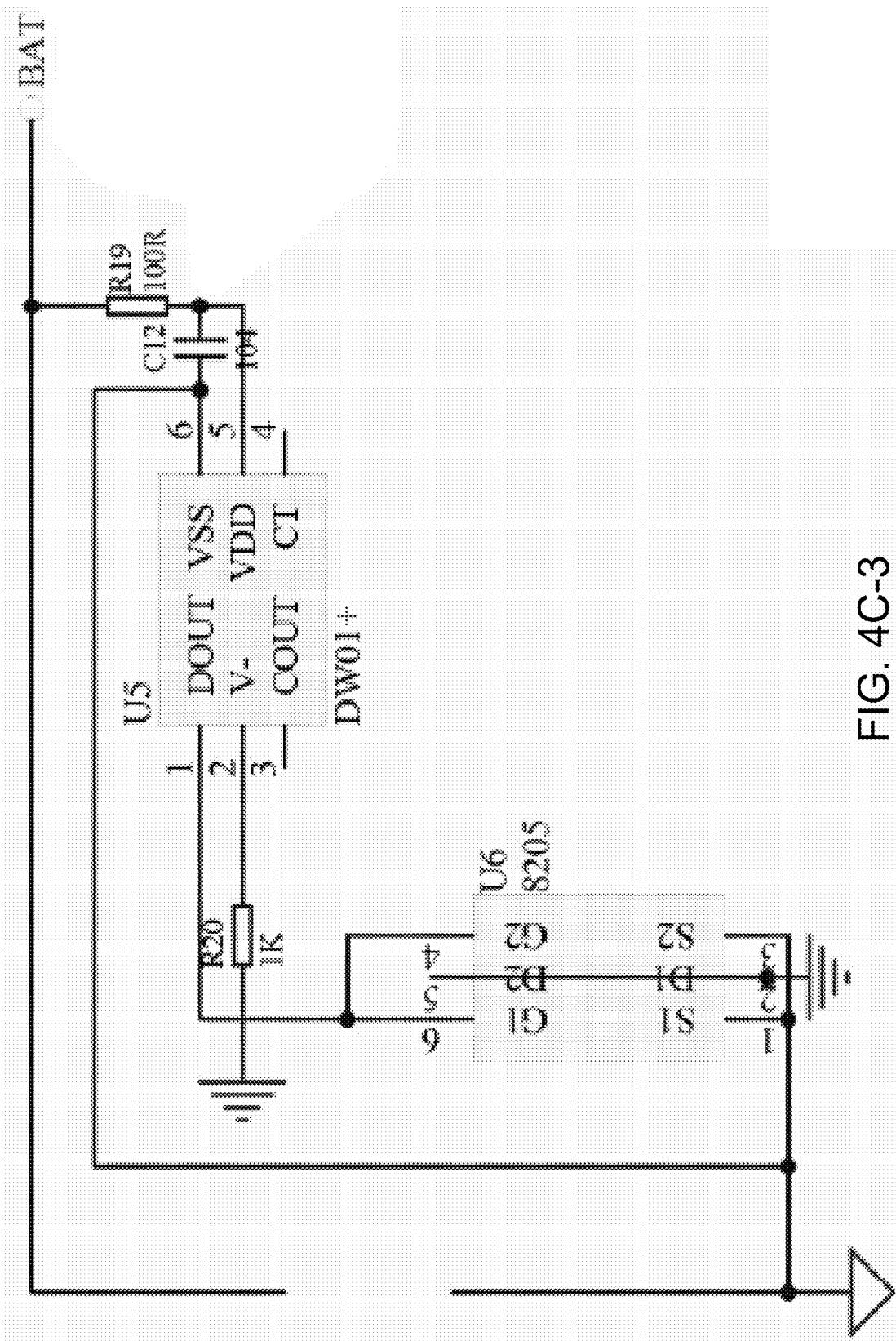
Figures 4, 4C:
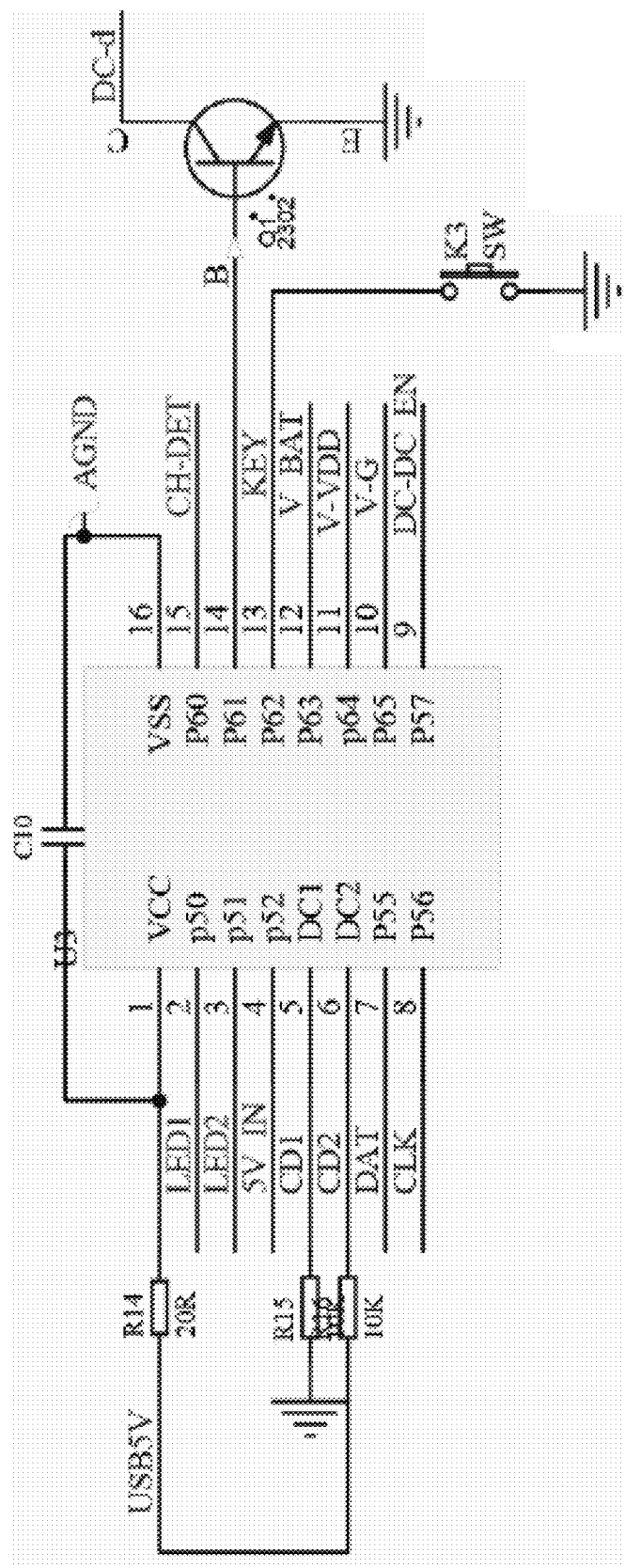
Figures 4, 4C, 5:
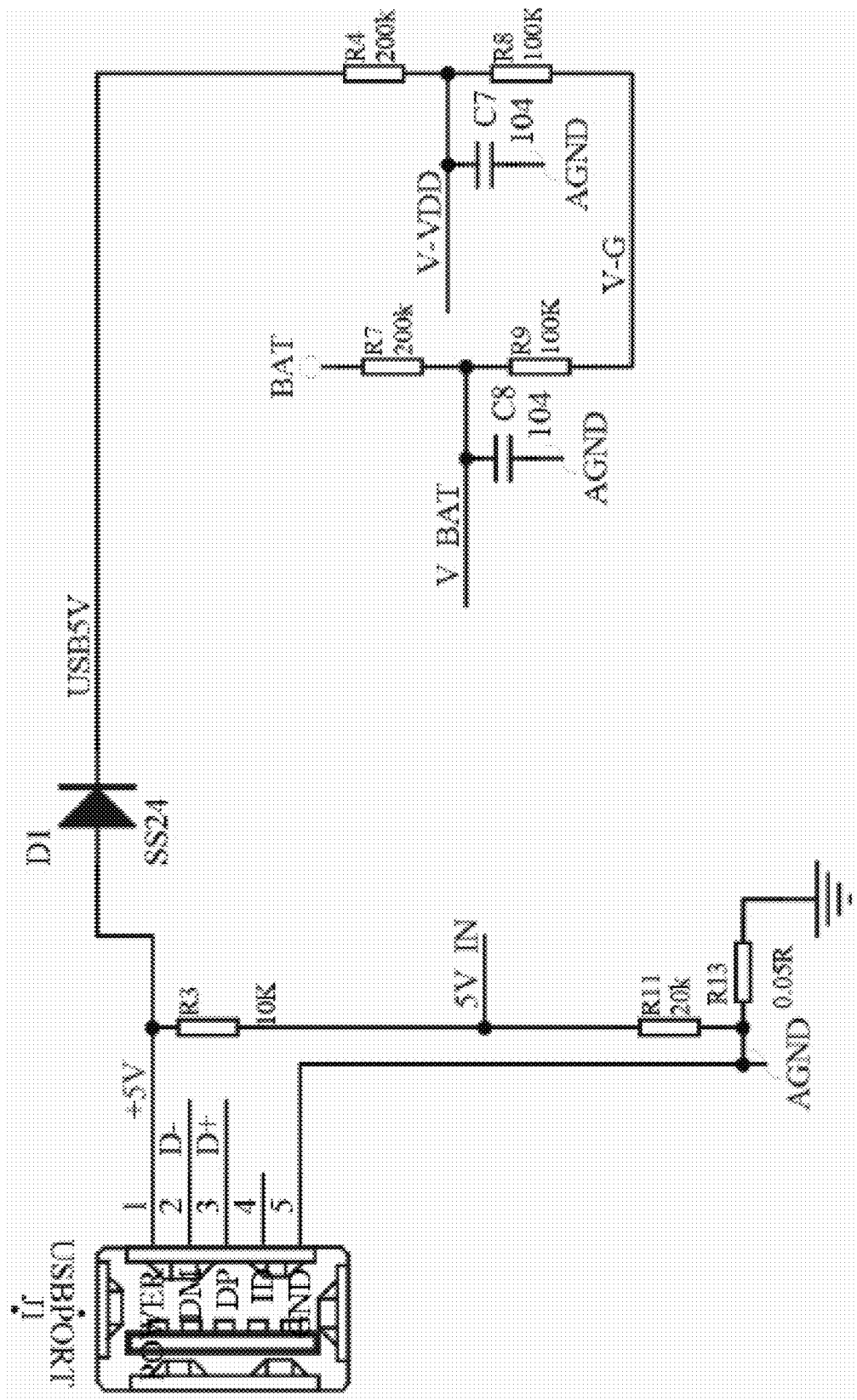

In more variations, this startup functionality depicted in FIG. 3A also includes the calling of additional startup routines 26 for enabling one or more functionalities that are dependent on ensuring that a predetermined minimum number of promotional media plays on the VIP 13 are first completed, as tracked by the onboard Actvation Count stored in the VIP's 13 onboard non-volatile memory 6. Refer specifically to FIG. 3B, which depicts the process to enable three such functionalities. In an embodiment, upon startup, the Activation Count is first incremented and stored in the onboard non-volatile memory 30. This is then followed by a comparison 31 of the stored Activation Count with the stored reference values for:

- a light-sensing-based AUTO-RUN function 33 for the VIP 13 in which the VIP 13 can be caused to automatically startup as soon as it is removed from its packaging and senses the ambient light;
- a Mute Default function that allows the VIP 13 to startup in a mode that mutes the initial promotional media play; and
- an Open-Multimedia Manager function to allow the VIP 13 to mount to a connected host computing device 14 via either USB or WiFi.

For the light-sensing-based AUTO-RUN function comparison 33, if the Activation Count is greater than or equal to a predetermined stored reference value, then the AUTO-RUN function will be disabled 33B, as the VIP 13 has been operated enough times to exhibit/play the promotional media to meet the predetermined requirements of the promotions company that provided the VIP 13. Otherwise, if the Activation Count is less than the predetermined stored reference value, and if the light sensor 1C-1 of the VIP 13, if so equipped, detects enough ambient light 33C, then the VIP multimedia sequence will be allowed to automatically start 33A.

For the Mute Default function comparison 34, if the Activation Count is greater than or equal to a predetermined stored reference value, then the Multimedia function of the VIP 13 will be allowed to start up with the sound muted 34B. Otherwise, if the Activation Count is less than the predetermined stored reference value, then the Multimedia function of the VIP 13 will be allowed to start up with the audio ON (that is, not muted) 34A.

For the Open-Multimedia Manager function, comparison 35, if the Activation Count is greater than or equal to a predetermined stored reference value, then the VIP 13 will be allowed to mount as a storage device when connected to a host computing device 14, via either USB or WiFi 35B. Otherwise, if the Activation Count is less than the predetermined stored reference value, then the Open-Multimedia Manager function will not be enabled, and the VIP 13 will remain "invisible" to a host computing device when connected 35A.

Notably, a person ordinarily skilled in the art will appreciate that other embodiments could use all or some of the three enabling subprocesses 33, 34, 35 depicted in FIG. 3B, and that such subprocesses need not be performed in the order shown in FIG. 3B.

V. Example Methods of Use for an Improved Portable Powerbank with Integrated Promotional-Media-Play Capabilities This Section V is generally directed to some methods of use of an improved portable powerbank (or battery bank) that is integrated with video storage and playback/display capabilities for use as a promotional product and/or related services, as described in Sections III and IV, supra. Refer to FIGS. 3A through 3I, as well as FIGS. 1A through 1I, 2, 4A, 4B-1 through 4B-8, and 4C-1 through 4C-5.

In one embodiment, the VIP 13 is combined with wireless pager-type functionality such that it is ideal for use in a setting where customers are subjected to significant wait/stationary time. In such a setting, customers often spend the wait time using their respective mobile devices 14 for myriad purposes and depleting the mobile-device 14 charge in the process. In a method of use, such a customer could be provided a pager-enabled VIP 13 such that the customer can employ the VIP's 13 charging feature for his or her mobile-electronic device 14 while being exposed to one or more promotional videos or other promotional content. Examples of venues that could benefit from this functionality include restaurants, airports, amusement parks, sports events, doctor's offices, trips on transportation vehicles, etc. A WiFi-enabled/pager-enabled VIP 13 can be used as an "on-spot" promotional item and pager in any situation that involves wait/stationary time commensurate with a meaningful charging service for a mobile-electronic device 14 (such as a smartphone or tablet computer); e.g., use by restaurants, airports, amusement parks, sporting events, medical-provider offices, transportation-vehicle vendors/service providers, etc.

In another method of use, the VIP 13 can be adapted to electronically provide a "courtesy coupon" whose value is proportional to the wait time endured by the customer/user, which is stored in memory 6, redeemable at the end of the waiting/charging period pursuant to predetermined rules governing a business' electronic-coupon program. Such coupon functionality could also be used to promote add-on sales/up-sells/cross-sells of other goods and/or services. This in turn could enhance customers' perceived goodwill of the company being promoted, as consumers are "rewarded" for their wait; it may even make waiting desirable or at least more tolerable.

VI. An Improved Portable Powerbank with Integrated Promotional-Media-Play Capabilities This Section VI is directed to various embodiments of an improved powerbank device with integrated media-play capabilities. Refer to FIGS. 1A through 1I, 2, 3A through 3I, 4A, 4B-1 through 4B-8, and 4C-1 through 4C-5.

In an embodiment, the improved portable powerbank device 13, comprises: one or more internal rechargeable batteries 10; at least one printed circuit board 6 comprising onboard memory and programmable logic components in order to manage both the charging functionality and media-play functionality; at least one port 6B adapted to receive a connector cable that is used to facilitate recharging said one or more rechargeable batteries 10 from an external power source or to facilitate transferring data between an external computing device or updating the programming of said improved portable powerbank device 13; at least one port adapted to receive a Type-A USB cable 6A, 6C to facilitate a connection to charge a mobile-electronics device 14; at least one speaker 5, 5A, 5B member to facilitate audio play; and at least one graphical-display screen 11.

In variations, the improved portable powerbank device 13 further comprises the storage of at least one promotional media file; and programming to automatically play said promotional media file upon the startup of the improved portable powerbank device 13. In many embodiments, said at least one promotional media file is selected from the group consisting of video files, audio files, and static-image files.

In additional enhancements, the improved portable powerbank device 13 further comprises the storage of at least one non-promotional media file; and programming to allow an end-user to play said non-promotional media file. In many embodiments, said at least one non-promotional media file is selected from the group consisting of video files, audio files, and static-image files.

In another embodiment, said at least one printed circuit board 6 includes components for WiFi connectivity with an external computing device or network. In related variations, said at least one printed circuit board 6 includes components for pager functionality.

In some embodiments, the improved portable powerbank device 13 further comprises at least one Activation Count parameter stored in non-volatile memory 6 to monitor how many times said improved portable powerbank device 13 has been operated since the last time said Activation Count parameter was reset to ZERO. This Activation Count parameter is used for several control-logic algorithms described below.

In one enhancement to the improved portable powerbank device 13, the device further comprises: a predetermined Mute Default function reference number parameter stored in non-volatile memory 6; and control-logic programming 6 that comprises the following steps:
Compare said Activation Count parameter to said Mute Default function reference number;
If said Activation Count parameter is greater than or equal to said predetermined Mute Default function reference number, then enable the play of said promotional media file with the audio functionality in the MUTE mode; and
If said Activation Count parameter is less than said predetermined Mute Default function reference number, then said the audio play of said promotional media file to ON by default.

In one enhancement to the improved portable powerbank device 13, the device further comprises: a predetermined Multimedia Manager function reference number parameter stored in non-volatile memory 6; and control-logic programming 6 that comprises the following steps:
Compare said Activation Count parameter to said Multimedia Manager function reference number;
If said Activation Count parameter is greater than or equal to said predetermined Multimedia Manager function reference number, then enable said improved portable powerbank device 13 to mount as a storage device 14 when connected to a host computing device; and
If said Activation Count parameter is less than said predetermined Multimedia Manager function reference number, then disable the ability of said improved portable powerbank device 13 to mount an external computing device 14 as a storage device.

In one enhancement to the improved portable powerbank device 13, the device further comprises: an onboard light sensor 1C-1 for detecting ambient light external to said improved portable powerbank device 13; a predetermined AUTO-RUN function reference number parameter stored in non-volatile memory 6; and control-logic programming 6 that comprises the following steps:
Compare the ambient light detected by said onboard light sensor 1C-1 to a predetermined threshold;
Compare said Activation Count parameter to said AUTO-RUN function reference number;
If said Activation Count parameter is less than said predetermined AUTO-RUN function reference number and said detected light exceeds a predetermined threshold, then enable the automatic startup of said improved portable powerbank device 13; and
If said Activation Count parameter is greater than or equal to said predetermined AUTO-RUN function reference number, then disable the ability of said improved portable powerbank device 13 to automatically startup.

In one enhancement to the improved portable powerbank device 13, the device further comprises control-logic programming 6 that comprises the following steps:
Determine whether said improved portable powerbank device 13 is connected to a mobile-computing device 14;
If said improved portable powerbank device 13 is not connected to a mobile-computing device 14, then end procedure;
If said improved portable powerbank device 13 is connected to a mobile-computing device 14, then request connected mobile device 14 to prompt an end-user to allow access to said mobile-computing device 14 to access said mobile-computing device's 14 GPS location data;
If said end-user does not grant access to said mobile-computing device's 14 GPS location data, then end procedure;
If said end-user does grant access to said mobile-computing device's 14 GPS location data, then retrieve said location data and communicate said location data from a connected network server 15, 16, 17, 18, and
Retrieve location-customized content and display on said improved portable powerbank device 13.

In one enhancement to the improved portable powerbank device 13, the device further comprises a time-based content trigger parameter stored in non-volatile memory 6, and control-logic programming 6 that comprises the following steps:
Determine the current date and time;
Compare said current date and time to said time-based content trigger parameter;
If said current date and time is greater than or equal to said time-based content trigger parameter, then retrieve time-based content from a connected network server 15, 16, 17, 18, and
If said current date and time is less than said time-based content trigger parameter, then end procedure.

VII. A Method of Making an Improved Portable Powerbank with Integrated Promotional-Media-Play Capabilities This Section VII is directed to various embodiments of a method of making an improved powerbank device with integrated media-play capabilities. Refer to FIGS. 1A through 1I, 2, 3A through 3I, 4A, 4B-1 through 4B-8, and 4C-1 through 4C-5.

In an embodiment, the method comprises the steps of: providing one or more internal rechargeable batteries 10; providing at least one printed circuit board 6 comprising onboard memory and programmable logic components in order to manage both the charging functionality and media-play functionality; providing at least one port 6B adapted to receive a connector cable that is used to facilitate recharging said one or more rechargeable batteries 10 from an external power source or to facilitate transferring data between an external computing device or updating the programming of said improved portable powerbank device 13; providing at least one port adapted to receive a Type-A USB cable 6A, 6C to facilitate a connection to charge a mobile-electronics device 14; providing at least one speaker 5, 5A, 5B member to facilitate audio play; and providing at least one graphical-display screen 11.

In variations, the method further comprises the steps of providing the storage of at least one promotional media file; and providing programming to automatically play said promotional media file upon the startup of the improved portable powerbank device 13. In many embodiments, said at least one promotional media file is selected from the group consisting of video files, audio files, and static-image files.

In additional enhancements, the method further comprises the steps of providing the storage of at least one non-promotional media file; and providing programming to allow an end-user to play said non-promotional media file. In many embodiments, said at least one non-promotional media file is selected from the group consisting of video files, audio files, and static-image files.

In another embodiment, the method further comprises the step of providing said at least one printed circuit board 6 with components for WiFi connectivity with an external computing device or network. In related variations, the method also further comprises the step of providing said at least one printed circuit board 6 with components for pager functionality.

In some embodiments, the method further comprises the step of providing at least one Activation Count parameter stored in non-volatile memory 6 to monitor how many times said improved portable powerbank device 13 has been operated since the last time said Activation Count parameter was reset to ZERO. This Activation Count parameter is used for several control-logic algorithms described below.

In one enhancement to the method, the method further comprises the steps of: providing a predetermined Mute Default function reference number parameter stored in non-volatile memory 6; and providing control-logic programming 6 that comprises the following steps:
  Compare said Activation Count parameter to said Mute Default function reference number;
  If said Activation Count parameter is greater than or equal to said predetermined Mute Default function reference number, then enable the play of said promotional media file with the audio functionality in the MUTE mode; and
  If said Activation Count parameter is less than said predetermined Mute Default function reference number, then said the audio play of said promotional media file to ON by default.

In one enhancement to the method, the method further comprises the steps of: providing a predetermined Multimedia Manager function reference number parameter stored in non-volatile memory 6; and providing control-logic programming 6 that comprises the following steps:
  Compare said Activation Count parameter to said Multimedia Manager function reference number;
  If said Activation Count parameter is greater than or equal to said predetermined Multimedia Manager function reference number, then enable said improved portable powerbank device 13 to mount as a storage device 14 when connected to a host computing device; and
  If said Activation Count parameter is less than said predetermined Multimedia Manager function reference number, then disable the ability of said improved portable powerbank device 13 to mount an external computing device 14 as a storage device.

In one enhancement to the method, the method further comprises the steps of: providing an onboard light sensor 1C-1 for detecting ambient light external to said improved portable powerbank device 13; providing a predetermined AUTO-RUN function reference number parameter stored in non-volatile memory 6; and providing control-logic programming 6 that comprises the following steps:
  Compare the ambient light detected by said onboard light sensor 1C-1 to a predetermined threshold;
  Compare said Activation Count parameter to said AUTO-RUN function reference number;
  If said Activation Count parameter is less than said predetermined AUTO-RUN function reference number and said detected light exceeds a predetermined threshold, then enable the automatic startup of said improved portable powerbank device 13; and
  If said Activation Count parameter is greater than or equal to said predetermined AUTO-RUN function reference number, then disable the ability of said improved portable powerbank device 13 to automatically startup.

In one enhancement to the method, the method further comprises the steps of: providing control-logic programming 6 that comprises the following steps:
  Determine whether said improved portable powerbank device 13 is connected to a mobile-computing device 14;
  If said improved portable powerbank device 13 is not connected to a mobile-computing device 14, then end procedure;
  If said improved portable powerbank device 13 is connected to a mobile-computing device 14, then request connected mobile device 14 to prompt an end-user to allow access to said mobile-computing device 14 to access said mobile-computing device's 14 GPS location data;
  If said end-user does not grant access to said mobile-computing device's 14 GPS location data, then end procedure;
  If said end-user does grant access to said mobile-computing device's 14 GPS location data, then retrieve said location data and communicate said location data from a connected network server 15, 16, 17, 18, and
  Retrieve location-customized content and display on said improved portable powerbank device 13.

In one enhancement to the method, the method further comprises the steps of: providing a time-based content trigger parameter stored in non-volatile memory 6, and providing control-logic programming 6 that comprises the following steps:
  Determine the current date and time;
  Compare said current date and time to said time-based content trigger parameter;

If said current date and time is greater than or equal to said time-based content trigger parameter, then retrieve time-based content from a connected network server 15, 16, 17, 18, and If said current date and time is less than said time-based content trigger parameter, then end procedure.

VIII. A Method of Using an Improved Portable Powerbank with Integrated Promotional-Media-Play Capabilities This Section VIII is directed to various embodiments of a method of using an improved powerbank device with integrated media-play capabilities. Refer to FIGS. 1A through 1I, 2, 3A through 3I, 4A, 4B-1 through 4B-8, and 4C-1 through 4C-5.

In an embodiment, the method comprises the steps of:
By a business, obtaining an improved portable powerbank device 13, via either purchase or leasing, pursuant to the descriptions provided in Sections III, IV, V, VI, and/or VII, supra;
By said business, starting up said improved portable powerbank device 13, establishing WiFi communication of said device 13 with said business' network 15, 16, 17, 18;
By said business, providing said device 13 to a customer who is waiting for service;
By said customer, as needed, connecting a mobile-electronic device 14 via USB cable to said improved portable powerbank device to initiate charging of said mobile-electronic device 14;
By said improved portable powerbank device 13, playing said at least one promotional media file;
By said business, sending a paging signal to said improved portable powerbank device 13 to alert said customer that said business is ready to render said service, and
By said customer, contacting the business and returning said improved portable powerbank device 13.

In variations, said business is selected from the group consisting of restaurant, theatre, sporting event, airports, transportation-service providers, amusement parks, medical-service provider office, and dental-service provider.

In additional embodiments, wherein said improved portable powerbank device 13 further comprises control logic to monitor and store the wait time between the startup of said improved portable powerbank device 13 and when said customer returns said improved portable powerbank device 13 to said business, the method further comprises the steps of:
By said business, after receiving said customer-returned improved portable powerbank device 13, connecting said improved portable powerbank device 13 to an external computing device and determining the value of said wait time that is stored on said improved portable powerbank device 13; and
By a business, issuing said customer a predetermined reward associated with the amount of time said customer had to wait for said service.

In some variations, said predetermined reward is issued to said customer in the form of an electronic coupon that said customer can redeem for said predetermined reward. In still more variations, said electronic coupon is transmitted to customer via a means selected from the group consisting of email, text messaging, physical postal service, USB thumb drive, web-based redeemable code, and paper coupon. In many embodiments, said electronic coupon provides a discount for said customer to purchase additional goods or services from said business.

IX. Alternative Embodiments and Other Variations

The various embodiments and variations thereof described herein, including the descriptions in any appended Claims and/or illustrated in the accompanying Figures, are merely exemplary and are not meant to limit the scope of the inventive disclosure. It should be appreciated that numerous variations of the invention have been contemplated as would be obvious to one of ordinary skill in the art with the benefit of this disclosure.

Hence, those ordinarily skilled in the art will have no difficulty devising myriad obvious variations and improvements to the invention, all of which are intended to be encompassed within the scope of the Description, Figures, and appended Claims herein.

The invention claimed is:

1. An improved portable powerbank device, comprising:
   one or more internal rechargeable batteries;
   at least one printed circuit board comprising onboard memory and programmable logic components in order to manage both charging functionality and media-play functionality;
   at least one Activation Count parameter, for controlling audio-visual functionality within the powerbank device, stored in non-volatile memory to monitor how many times said improved portable powerbank device has been operated since the last time said Activation Count parameter was reset to ZERO;
   at least one port adapted to receive a connector cable that is used to facilitate recharging said one or more rechargeable batteries from an external power source or to facilitate transferring data between an external computing device or updating the programming of said improved portable powerbank device;
   at least one port adapted to receive a Type-A USB cable to facilitate a connection to charge a mobile-electronics device;
   at least one speaker member to facilitate audio play; and
   at least one graphical-display screen.

2. The improved portable powerbank device of claim 1, further comprising:
   the storage of at least one promotional media file; and
   programming to automatically play said promotional media file upon the startup of the improved portable powerbank device.

3. The improved portable powerbank device of claim 2, further comprising:
   the storage of at least one non-promotional media file; and
   programming to allow an end-user to play said non-promotional media file.

4. The improved portable powerbank device of claim 2, wherein said at least one promotional media file is selected from the group consisting of video files, audio files, and static-image files.

5. The improved portable powerbank device of claim 2, wherein said at least one printed circuit board includes components for WiFi connectivity with an external computing device or network.

6. The improved portable powerbank device of claim 5, wherein said at least one printed circuit board includes components for pager functionality.

7. The improved portable powerbank device of claim 2, further comprising:

an onboard light sensor for detecting ambient light external to said improved portable powerbank device;
a predetermined AUTO-RUN function reference number parameter stored in non-volatile memory; and
control-logic programming that comprises the following steps:
  compare the ambient light detected by said onboard light sensor to a predetermined threshold,
  compare said Activation Count parameter to said AUTO-RUN function reference number,
  if said Activation Count parameter is less than said predetermined AUTO-RUN function reference number and said detected light exceeds a predetermined threshold, then enable the automatic startup of said improved portable powerbank device, and
  if said Activation Count parameter is greater than or equal to said predetermined AUTO-RUN function reference number, then disable the ability of said improved portable powerbank device to automatically startup.

8. The improved portable powerbank device of claim 2, further comprising:
a predetermined Mute Default function reference number parameter stored in non-volatile memory; and
control-logic programming that comprises the following steps:
  compare said Activation Count parameter to said Mute Default function reference number,
  if said Activation Count parameter is greater than or equal to said predetermined Mute Default function reference number, then enable the play of said promotional media file with the audio functionality in the MUTE mode, and
  if said Activation Count parameter is less than said predetermined Mute Default function reference number, then said the audio play of said promotional media file to ON by default.

9. The improved portable powerbank device of claim 1, further comprising:
a predetermined Multimedia Manager function reference number parameter stored in non-volatile memory; and
control-logic programming that comprises the following steps:
  compare said Activation Count parameter to said Multimedia Manager function reference number,
  if said Activation Count parameter is greater than or equal to said predetermined Multimedia Manager function reference number, then enable said improved portable powerbank device to mount a host computing device as a storage device, and
  if said Activation Count parameter is less than said predetermined Multimedia Manager function reference number, then disable the ability of said improved portable powerbank device to mount a host computing device as a storage device.

10. The improved portable powerbank device of claim 1, further comprising control-logic programming that comprises the following steps:
  determine whether said improved portable powerbank device is connected to a mobile-computing device;
  if said improved portable powerbank device is not connected to a mobile-computing device, then end procedure;
  if said improved portable powerbank device is connected to a mobile-computing device, then request said connected mobile-computing device to prompt an end-user to allow access to said connected mobile-computing device to access said connected mobile-computing device's GPS location data;
  if said end-user does not grant access to said connected mobile-computing device's GPS location data, then end procedure;
  if said end-user does grant access to said connected mobile-computing device's GPS location data, then retrieve said location data and communicate said location data from a connected network server; and
  retrieve location-customized content and display on said improved portable powerbank device.

11. The improved portable powerbank device of claim 1, further comprising:
a time-based content trigger parameter stored in non-volatile memory; and
control-logic programming that comprises the following steps:
  determine the current date and time,
  compare said current date and time to said time-based content trigger parameter,
  if said current date and time is greater than or equal to said time-based content trigger parameter, then retrieve time-based content from a connected network server, and
  if said current date and time is less than said time-based content trigger parameter, then end procedure.

12. A method of making an improved portable powerbank device, comprising the steps of:
providing one or more internal rechargeable batteries;
providing at least one printed circuit board comprising onboard memory and programmable logic components in order to manage both charging functionality and media-play functionality;
providing at least one Activation Count parameter, for controlling audio-visual functionality within the powerbank device, stored in non-volatile memory to monitor how many times said improved portable powerbank device has been operated since the last time said Activation Count parameter was reset to ZERO;
providing at least one port adapted to receive a connector cable that is used to facilitate recharging said one or more rechargeable batteries from an external power source or to facilitate transferring data between an external computing device or updating the providing programming of said improved portable powerbank device;
providing at least one port adapted to receive a Type-A USB cable to facilitate a connection to charge a mobile-electronics device;
providing at least one speaker member to facilitate audio play; and
providing at least one graphical-display screen.

13. The method of claim 12, further comprising the steps of:
providing the storage of at least one promotional media file; and
providing programming to automatically play said promotional media file upon the startup of the improved portable powerbank device.

14. The method of claim 13, further comprising the steps of:
providing the storage of at least one non-promotional media file; and
providing programming to allow an end-user to play said non-promotional media file.

15. The method of claim 13, wherein said at least one promotional media file is selected from the group consisting of video files, audio files, and static-image files.

16. The method of claim 13, wherein said at least one printed circuit board includes components for WiFi connectivity with an external computing device or network.

17. The method of claim 16, further comprising the step of providing said at least one printed circuit board with components for pager functionality.

18. The method of claim 13, further comprising the steps of:
providing an onboard light sensor for detecting ambient light external to said improved portable powerbank device;
providing a predetermined AUTO-RUN function reference number parameter stored in non-volatile memory; and
providing control-logic programming that comprises the following steps:
compare the ambient light detected by said onboard light sensor to a predetermined threshold,
compare said Activation Count parameter to said AUTO-RUN function reference number,
if said Activation Count parameter is less than said predetermined AUTO-RUN function reference number and said detected light exceeds a predetermined threshold, then enable the automatic startup of said improved portable powerbank device, and
if said Activation Count parameter is greater than or equal to said predetermined AUTO-RUN function reference number, then disable the ability of said improved portable powerbank device to automatically startup.

19. The method of claim 13, further comprising the steps of:
providing a predetermined Mute Default function reference number parameter stored in non-volatile memory; and
providing control-logic programming that comprises the following steps:
compare said Activation Count parameter to said Mute Default function reference number,
if said Activation Count parameter is greater than or equal to said predetermined Mute Default function reference number, then enable the play of said promotional media file with the audio functionality in the MUTE mode, and
if said Activation Count parameter is less than said predetermined Mute Default function reference number, then said the audio play of said promotional media file to ON by default.

20. The method of claim 12, further comprising the steps of:
providing a predetermined Multimedia Manager function reference number parameter stored in non-volatile memory; and
providing control-logic programming that comprises the following steps:
compare said Activation Count parameter to said Multimedia Manager function reference number,
if said Activation Count parameter is greater than or equal to said predetermined Multimedia Manager function reference number, then enable said improved portable powerbank device to mount a host computing device as a storage device, and
if said Activation Count parameter is less than said predetermined Multimedia Manager function reference number, then disable the ability of said improved portable powerbank device to mount a host computing device as a storage device.

21. The method of claim 12, further comprising the step of
providing control-logic programming that comprises the following steps:
determine whether said improved portable powerbank device is connected to a mobile-computing device;
if said improved portable powerbank device is not connected to a mobile-computing device, then end procedure;
if said improved portable powerbank device is connected to a mobile-computing device, then request said connected mobile-computing device to prompt an end-user to allow access to said connected mobile-computing device to access said connected mobile-computing device's GPS location data;
if said end-user does not grant access to said connected mobile-computing device's GPS location data, then end procedure;
if said end-user does grant access to said connected mobile-computing device's GPS location data, then retrieve said location data and communicate said location data from a connected network server; and
retrieve location-customized content and display on said improved portable powerbank device.

22. The method of claim 12, further comprising the steps of:
providing a time-based content trigger parameter stored in non-volatile memory; and
providing control-logic programming that comprises the following steps:
determine the current date and time,
compare said current date and time to said time-based content trigger parameter,
if said current date and time is greater than or equal to said time-based content trigger parameter, then retrieve time-based content from a connected network server, and
if said current date and time is less than said time-based content trigger parameter, then end procedure.

23. A method of using an improved portable powerbank device by a business that owns or leases at least one improved portable powerbank device to provide services to one or more customers;
said device comprising:
one or more internal rechargeable batteries,
at least one printed circuit board comprising onboard memory and programmable logic components in order to manage both charging functionality and media-play functionality, wherein:
said at least one printed circuit board includes components for WiFi connectivity with an external computing device or network, and
said at least one printed circuit board includes components for pager functionality,
at least one Activation Count parameter stored in non-volatile memory to monitor how many times said improved portable powerbank device has been operated since the last time said Activation Count parameter, for controlling audio-visual functionality within the powerbank device, was reset to ZERO;
at least one port adapted to receive a connector cable that is used to facilitate recharging said one or more rechargeable batteries from an external power source or to facilitate transferring data between an external computing device or updating the programming of said improved portable powerbank device, at least one port adapted to receive a Type-A USB cable to facilitate a connection to charge a mobile-electronics device, at least one speaker member to facilitate audio play, at least one graphical-display screen, the storage of at least one promotional media file, and programming to automatically play said at least one promotional media file upon the startup of the improved portable powerbank device;

the method comprising the steps of:

by said business, starting up said improved portable powerbank device, establishing WiFi communication of said device with said business' network, then providing said device to a customer who is waiting for service, by said customer, as needed, connecting a mobile-electronic device via USB cable to said improved portable powerbank device to initiate charging of said mobile-electronic device, by said improved portable powerbank device, playing said at least one promotional media file, by said business, sending a paging signal to said improved portable powerbank device to alert said customer that said business is ready to render said service, and by said customer, contacting the business and returning said improved portable powerbank device.

24. The method of claim 23, wherein said business is selected from the group consisting of restaurant, theatre, sporting event, airports, transportation-service providers, amusement parks, medical-service provider office, and dental-service provider.

25. The method of claim 23, wherein said improved portable powerbank device further comprises control logic to monitor and store the wait time between the startup of said improved portable powerbank device and when said customer returns said improved portable powerbank device to said business, the method further comprising the steps of:

by said business, after receiving said customer-returned improved portable powerbank device, connecting said improved portable powerbank device to an external computing device and determining the value of said wait time that is stored on said improved portable powerbank device; and by said business, issuing said customer a predetermined reward associated with the amount of time said customer had to wait for said service.

26. The method of claim 25, wherein said predetermined reward is issued to said customer in the form of an electronic coupon that said customer can redeem for said predetermined reward.

27. The method of claim 26, wherein said electronic coupon is transmitted to customer via a means selected from the group consisting of email, text messaging, physical postal service, USB thumb drive, web-based redeemable code, and paper coupon.

28. The method of claim 27, wherein said electronic coupon provides a discount for said customer to purchase additional goods or services from said business.

* * * * *